US008925799B1

(12) United States Patent
Harty et al.

(10) Patent No.: US 8,925,799 B1
(45) Date of Patent: Jan. 6, 2015

(54) AUTOMATED BANKING MACHINE RESPONSIVE TO DATA BEARING RECORDS

(75) Inventors: Michael J. Harty, Canton, OH (US); H. Thomas Graef, Bolivar, OH (US); David E. Kolinski-Schultz, Canton, OH (US)

(73) Assignee: Diebold Self-Service Systems division of Diebold, Incorporated, North Canton, OH (US)

( * ) Notice: Subject to any disclaimer, the term of this patent is extended or adjusted under 35 U.S.C. 154(b) by 300 days.

(21) Appl. No.: 13/421,151

(22) Filed: Mar. 15, 2012

Related U.S. Application Data

(60) Provisional application No. 61/465,543, filed on Mar. 21, 2011.

(51) Int. Cl.
*G06Q 40/00* (2012.01)

(52) U.S. Cl.
USPC .......... 235/379

(58) Field of Classification Search
CPC ..... G07F 19/20; G07F 19/205; G07F 19/201; B65H 2220/02; B65H 2511/152; G06Q 20/1085; G06Q 20/40
See application file for complete search history.

(56) References Cited

U.S. PATENT DOCUMENTS

| | | | | |
|---|---|---|---|---|
| 6,196,037 | B1 * | 3/2001 | Urschel et al. | 70/416 |
| 7,337,955 | B1 * | 3/2008 | Block et al. | 235/379 |
| 8,336,765 | B1 * | 12/2012 | Crews et al. | 235/379 |
| 2007/0176349 | A1 * | 8/2007 | Gerlier et al. | 271/10.03 |

* cited by examiner

*Primary Examiner* — Thien M Le
*Assistant Examiner* — Tae Kim
(74) *Attorney, Agent, or Firm* — Black, McCuskey, Souers & Arbaugh, LPA

(57) ABSTRACT

An automated banking machine operates to cause financial transfers responsive at least in part to data read from data bearing records. The machine includes a card reader operative to read card data corresponding to at least one of a user and a financial account. A computer associated with the machine is operative to cause a determination to be made that the card data corresponds to a financial account authorized to conduct a transaction through operation of the machine. The account corresponding to the card data is assessed or credited with a value associated with the transaction. A record of the transaction is printed through operation of a printer. The machine includes at least one serviceable component. Sensors are operative to sense whether a serviceable component is in an operative position, and to provide an indication related thereto.

20 Claims, 23 Drawing Sheets

AUTOMATED BANKING MACHINE RESPONSIVE TO DATA BEARING RECORDS

CROSS REFERENCE TO RELATED APPLICATION

This Application claims benefit pursuant to 35 U.S.C. §119(e) of Provisional Application Ser. No. 61/465,543 filed Mar. 21, 2011, the disclosure of which is incorporated herein by reference in its entirety.

TECHNICAL FIELD

This invention relates to automated banking machines that operate responsive to data read from user cards and which may be classified in U.S. Class 235, Subclass 379.

BACKGROUND ART

Automated banking machines may include a card reader that operates to read data from a bearer record such as a user card. Automated banking machines may operate to cause the data read from the card to be compared with other computer stored data related to the bearer or their financial accounts. The machine operates in response to the comparison determining that the bearer record corresponds to an authorized user and/or an authorized financial account, to carry out at least one transaction which may be operative to transfer value to or from at least one account. A record of the transaction is often printed through operation of the automated banking machine and provided to the user. Automated banking machines may be used to carry out transactions such as dispensing cash, the making of deposits, the transfer of funds between accounts and account balance inquiries. The types of banking transactions that may be carried out are determined by the capabilities of the particular banking machine and system, as well as the programming of the institution operating the machine.

Other types of automated banking machines may be operated by merchants to carry out commercial transactions. These transactions may include, for example, the acceptance of deposit bags, the receipt of checks or other financial instruments, the dispensing of rolled coin, or other transactions required by merchants. Still other types of automated banking machines may be used by service providers in a transaction environment such as at a bank to carry out financial transactions. Such transactions may include for example, the counting and storage of currency notes or other financial instrument sheets, and other types of transactions. For purposes of this disclosure an automated banking machine, automated transaction machine or an automated teller machine (ATM) shall be deemed to include any machine that may be used to automatically carry out transactions involving transfers of value.

Automated banking machines may benefit from improvements.

OBJECTS OF EXEMPLARY EMBODIMENTS

It is an object of an exemplary embodiment to provide a banking system apparatus that is operated responsive to data bearing records.

It is an object of an exemplary embodiment to provide an automated banking machine.

It is a further object of an exemplary embodiment to provide an automated banking machine that has an attractive appearance.

It is a further object of an exemplary embodiment to provide an automated banking machine which is more readily serviced.

It is a further object of an exemplary embodiment to provide an automated banking machine which is more readily manufactured.

It is a further object of an exemplary embodiment to provide an automated banking machine which requires less space for servicing.

It is a further object of an exemplary embodiment to provide an automated banking machine which provides improved access for servicing of internal components.

It is a further object of an exemplary embodiment to provide an automated banking machine which communicates status information to a remote location.

It is a further object of an exemplary embodiment to provide a method of servicing an automated banking machine which provides ease and efficiency in servicing serviceable modules.

Further objects of exemplary embodiments will be made apparent in the following Detailed Description of Exemplary Embodiments and the appended claims.

The foregoing objects are accomplished in an exemplary embodiment by an automated banking machine which includes a top housing bounding an interior area. The automated banking machine includes a card reader that reads data from user cards. The data read from user cards is used to enable the machine to operate to carry out financial transactions. The top housing defines a front opening to the interior area. The top housing is mounted above a secure enclosure which is alternatively referred to herein as a chest or safe.

The top housing houses upper banking machine components which may include, for example, a display, the card reader, a receipt printer, a keypad, controllers, actuators, sensors, and others. As used herein "keypad" means input keys whether arranged in a keypad arrangement, keyboard arrangement, or otherwise, and the designations are interchangeable unless expressly identified as being used in a restricted manner. The chest houses lower banking machine components which may include, for example, a currency dispenser, a currency recycler, a secure deposit holding container, a check acceptor, a document printer and other devices.

The exemplary automated banking machine includes an upper fascia adapted to selectively cover the front opening. The upper fascia includes a rearwardly extending projection which selectively overlies a forward region of the top housing adjacent the front opening to provide an attractive appearance to the machine. In one example embodiment, the upper fascia is movable between a first position where the upper fascia covers the front opening, and a second position where the fascia is disposed away from the front opening.

A lower fascia is moveably mounted in supporting connection with the chest. The lower fascia of an exemplary embodiment is selectively movable between a covering position wherein the lower fascia covers a closed chest door and an accessible position where the lower fascia is disposed away from the closed chest door.

The lower fascia includes first and second side extensions so that when the lower fascia is in the covering position the first and second side extensions respectively cover forward portions of the first and second side walls of the chest housing.

In one exemplary embodiment, a rollout tray is moveably mounted in operatively supported connection with the top housing. Several of the upper banking machine components may be supported on the rollout tray. Additionally, the upper fascia may be mounted to the rollout tray. The rollout tray is movable between a retractable position where the rollout tray is in the interior area and an extended position where the rollout tray extends from the front opening. When the rollout tray is in the retracted position, the upper fascia selectively covers the front opening. When the rollout tray is in the extended position, the banking components mounted thereon may be more readily serviced.

The chest of the exemplary embodiment includes a door selectively movable between a closed position and an open position. In one embodiment, when the lower fascia is in the accessible position and the chest door is in the open position, the lower fascia is adapted to engage the chest door to retain the door in the open position. The lower fascia is adapted for movement away from the chest door in order to release the door from engagement with the lower fascia.

In one exemplary embodiment, the chest housing includes a first opening at a first end thereof and a second opening at a second end thereof. Thus, a master chest housing may be used in either front-load or rear-load machine. A first chest door is an operable door and is adapted for selectively closing the first opening. A locking bolt mechanism is carried on the operable chest door.

A second chest door, not generally used during regular operation of the automated transaction machine, can be adapted to semi-permanently close the second opening. An alternate securing mechanism, such as bolts or other fasteners, may be used to semi-permanently engage the second chest door with the housing. As a result, the functional uses of the first and second chest doors can be selected so that the second chest door becomes the operational door, and the other door is securely mounted in a fixed position.

In one exemplary embodiment, a processor case housing the primary processor for the automated transaction machine, is rotationally mounted in operatively supported connection with the chest. The processor case is adapted for rotational movement between an operational position and a service position. In the operational position, a first functional side of the processor case faces a side wall of the top housing. In the service position, the first functional side of the processor case faces a front opening of the top housing.

In one embodiment, a rollout tray, supporting several upper banking machine components, is movable from a retracted position to an extended position to allow the processor case to rotate into the service position. In the service position, cables, connections, and other components, including one or more processors, are accessible for servicing.

In another exemplary embodiment, a top housing cover is mounted in slidable supporting relationship with the chest housing. Several upper banking machine components may be supported on a mounting tray equipped with side flanges. The top housing cover may include channel members for slidable engagement with the side flanges. The upper banking machine components may be accessed for servicing by rearwardly sliding the top housing cover. A plurality of fasteners and/or locking mechanisms may be employed to secure the top housing cover in an operational position. Alternately, the mounting tray may include channel members for slidable engagement with flange members carried on the top housing cover.

In another exemplary embodiment, an automated banking machine includes a housing which bounds an interior area and includes an opening to the interior area. A door is moveably mounted in operatively-supported connection with the housing, wherein the door is moveable between a closed position in which the door at least partially covers the opening and an open position. A card reader is in operatively supported connection with the housing, wherein the card reader is operative to read indicia on user cards corresponding to financial accounts. A display and a cash dispenser are in operatively supported connection with the housing. A serviceable component comprising a module is moveably mounted in operatively supported connection with the housing and is moveable between an operative position within the housing and a service position, in which at least a portion of the module extends in the opening. A first position sensor is in operatively supported connection with the housing, and, with the module in the operative position, the first position sensor is operative to sense a first portion of the module. At least one first indicator is in operatively supported connection with the housing and is operative to provide at least one output indicative that the first position sensor senses the module in the operative position.

In a further exemplary embodiment, a second position sensor is in operatively supported connection with the housing, and, with the module in the operative position, the second position sensor is operative to sense a second portion of the module. The second portion of the module is disposed from the first portion of the module. At least one second indicator is in operatively supported connection with the housing and the at least one second indicator is operative to provide at least one output indicative that the second position sensor senses the module in the operative position.

In a further exemplary embodiment, a third position sensor in operatively supported connection with the housing, and, with the module in the operative position, the third position sensor is operative to sense a third portion of the module. The third portion of the module is disposed from the first portion of the module and disposed from the second portion of the module. At least one third indicator is in operatively supported connection with the housing and is operative to provide at least one output indicative that the third position sensor senses the module in the operative position.

In a further exemplary embodiment, the first position sensor, the second position sensor, and the third position sensor are cooperatively operative to sense the position of the module in Cartesian coordinate space.

In a further exemplary embodiment, the at least one first indicator, the at least one second indicator, and the at least one third indicator are cooperatively operative to indicate the position of the module in Cartesian coordinate space.

In a further exemplary embodiment, a fourth position sensor is in operatively supported connection with the housing, and, with the door in the closed position, the fourth position sensor is operative to sense the door in the closed position. At least one fourth indicator is in operatively supported connection with the housing, and the at least one fourth indicator is operative to provide at least one output indicative that the door is in the closed position.

In a further exemplary embodiment, the first position sensor may include a reed switch, vane sensor, Hall effect sensor, magneto-resistive sensor, variable reluctance sensor, inductive sensor, infrared sensor, opto-electronic sensor or other type sensor.

In a further exemplary embodiment, at least one local processor is operatively connected to the first position sensor and operative to indicate the output of the first position sensor.

In a further exemplary embodiment, at least one remote processor is operatively connected to the at least one local processor and operative to indicate the output of the first position sensor.

In a further exemplary embodiment, the module may include one of a card reader, display, cash dispenser, check acceptor, bill acceptor, bill recycler and printer.

In a further exemplary embodiment, the first position sensor includes a first element operative to emit a signal and a second element operative to receive the signal.

An exemplary embodiment includes a method comprising extending a module in an opening in a housing of an automated banking machine. The automated banking machine includes a card reader operative to read data from cards including data corresponding to financial accounts. The exemplary machine also includes a display, and a cash dispenser. A service activity is conducted on the module while it is extended in the opening. Subsequent to conducting the service activity, the module is moved toward an operative position in the housing. During at least a portion of moving the module toward an operative position, at least one electronic indicator in operative connection with the housing is observed, which indicator indicates whether the module is in the operative position.

In a further exemplary embodiment, an exemplary method includes moving a door, moveably mounted in operatively supported connection with the housing, toward an open position.

In a further exemplary embodiment, an exemplary method includes moving a door, moveably mounted in operatively supported connection with the housing, toward a closed position, and, during at least a portion of doing so, observing at least one electronic indicator in operative connection with the housing which indicates whether the door is in the closed position.

In a further exemplary embodiment, an exemplary method includes determining, through operation of at least one local processor, that the module is not in the operative position; and if the module is determined to not be in the operative position, causing at least one message to be sent by the at least one local processor to a remote processor.

In a further exemplary embodiment, an exemplary method includes adjusting the module in the operative position.

In a further exemplary embodiment, an exemplary method includes while observing the at least one electronic indicator, determining, by observing the at least one electronic indicator, the orientation of the module relative to the operative position.

In a further exemplary embodiment, an exemplary method includes while determining, by observing the at least one electronic indicator, the orientation of the module relative to the operative position, determining the orientation of the module relative to the operative position in Cartesian space.

In a further exemplary embodiment, an apparatus includes an automated banking machine that is operative to cause financial transfers responsive at least in part to data read from data bearing records. The automated banking machine includes a housing that bounds an interior area and includes an opening to the interior area. The machine also includes a card reader that is operative to read card data usable to identify at least one of a user of the machine and a financial account. A computer is associated with the machine and is in operative connection with the card reader. The computer is operative to cause card data to be read through operation of the card reader and to communicate with a further computer to determine if the read card data corresponds to an account authorized to conduct a transaction using the machine. Other input data such as data corresponding to a customer personal identification number or other user identifying data may also be sent to the remote computer and a determination made that the data corresponds with the account. The machine may also accept inputs corresponding to a transaction type and an amount. The banking machine through communication with the remote computer causes the financial account corresponding to the card data to be assessed a value or credited with a value associated with a financial transaction.

The example machine further includes a door that is moveably mounted in operatively supported connection with the housing. The door is moveable between a closed position in which the door at least partially covers the opening and an open position. The machine also includes a serviceable component that is moveable between an operative position and a service position. The machine also includes at least one position sensor that is operative to sense the serviceable component in at least one position. The position sensor is operative to sense the at least one position of the serviceable component. The example machine includes at least one moveable member, which may include a stop that is moveably mounted relative to the housing and is operatively engageable with the door. The stop is in operative connection with the position sensor. The stop is operative responsive at least in part to the position sensor sensing that the serviceable component is not in the operative position to cause the door to be prevented from being moveable to the closed position when the serviceable component is not in the operative position. In other embodiments the stop or other moveable member is operative to cause the door from being prevented from being in a locked position if a serviceable component is not returned to the operative position.

In a further exemplary embodiment, the machine includes a printer that is selectively operative to cause the printing of indicia on paper loaded into the printer. The printer is operative to print a test mark on a side of the paper. The machine also includes a sensor in operative connection with the printer. The sensor is operative to sense the test mark on the side of the paper loaded in the printer and sense that the test mark is not on the side of the paper loaded in the printer. The machine also includes an indicator. The indicator is in operative relationship with the at least one sensor, wherein the indicator is operative to indicate a paper loading error in response to the sensor either failing to sense the test mark on the side of the paper loaded in the printer or sensing that the test mark is not on the side paper of the paper loaded in the printer.

In a further exemplary embodiment, the machine also includes a serviceable component. The computer is operatively connected with the serviceable component. The computer is operative to determine whether the serviceable component has data corresponding to a fault condition stored in a data store of the component. In the example embodiment the at least one computer is operative to cause the serviceable component to undergo a set of diagnostic tests, when the serviceable component is moved from a position in which the component may be serviced to the operative position. The set of diagnostic tests in an example embodiment includes a plurality of diagnostic tests. In this manner the serviceable component completes the set of diagnostic tests to assure that the serviceable component is ready and suitable to be placed in service when it is moved to the operative position. Completing the plurality of diagnostic tests may in some cases require considerable time. To avoid waiting for this time period, some embodiments may utilize an approach to more quickly identify that there is a problem. The computer is operative to cause the serviceable component to not undergo a complete set of diagnostic tests in response to the computer determining that the component does not have data corresponding to a fault stored in the data store of the component before the serviceable component is serviced. In still other example embodiments, the at least one computer may operate in response to determining that data corresponding to a fault stored in the at least one data store will cause at least one moveable member to be moved in a way that prevents attempts being made to place the machine back in service. This may include for example the moveable member being a stop that moves to a position that prevents the door of the housing in which the serviceable component is enclosed from being moved to the closed position. This thus alerts the servicer that the serviceable component includes a fault and cannot be placed back into service. This avoids taking the time that would otherwise be consumed in running the diagnostic tests, and then subsequently reporting that the serviceable component has a fault. Alternatively in other example embodiments, the moveable member may move so that the housing door cannot be locked or otherwise move in a manner that indicates to the servicer that there is a problem with the serviceable component and more actions are needed before the machine can be placed back into service.

In a further exemplary embodiment, the machine also includes a serviceable component moveable between and operative position within the housing and a service position. The machine also includes at least one position sensor operative to determine at least one position of the serviceable component. The machine also includes at least one moveable member, which may include a stop moveably mounted relative to the housing. The stop is in operative connection with the door and the at least one position sensor. The stop is operative responsive at least in part to the position sensor to cause the door to be prevented from being moveable to the closed position when the serviceable component is not in the operative position. The stop is operative responsive to at least in part to the at least one position sensor to cause the door to be allowed to be moveable to the closed position when the serviceable component is in the operative position. An exemplary method also includes moving the serviceable component to a service position and conducting a service activity on the serviceable component while the serviceable component is in the service position. Then the method further includes moving the serviceable component toward an operative position within the housing. The stop operates to cause the door to be allowed to be moveable to the closed position.

The principles described in exemplary embodiments may be applied to numerous automated banking machine configurations.

DETAILED DESCRIPTION OF EXEMPLARY EMBODIMENTS

Figure 1:
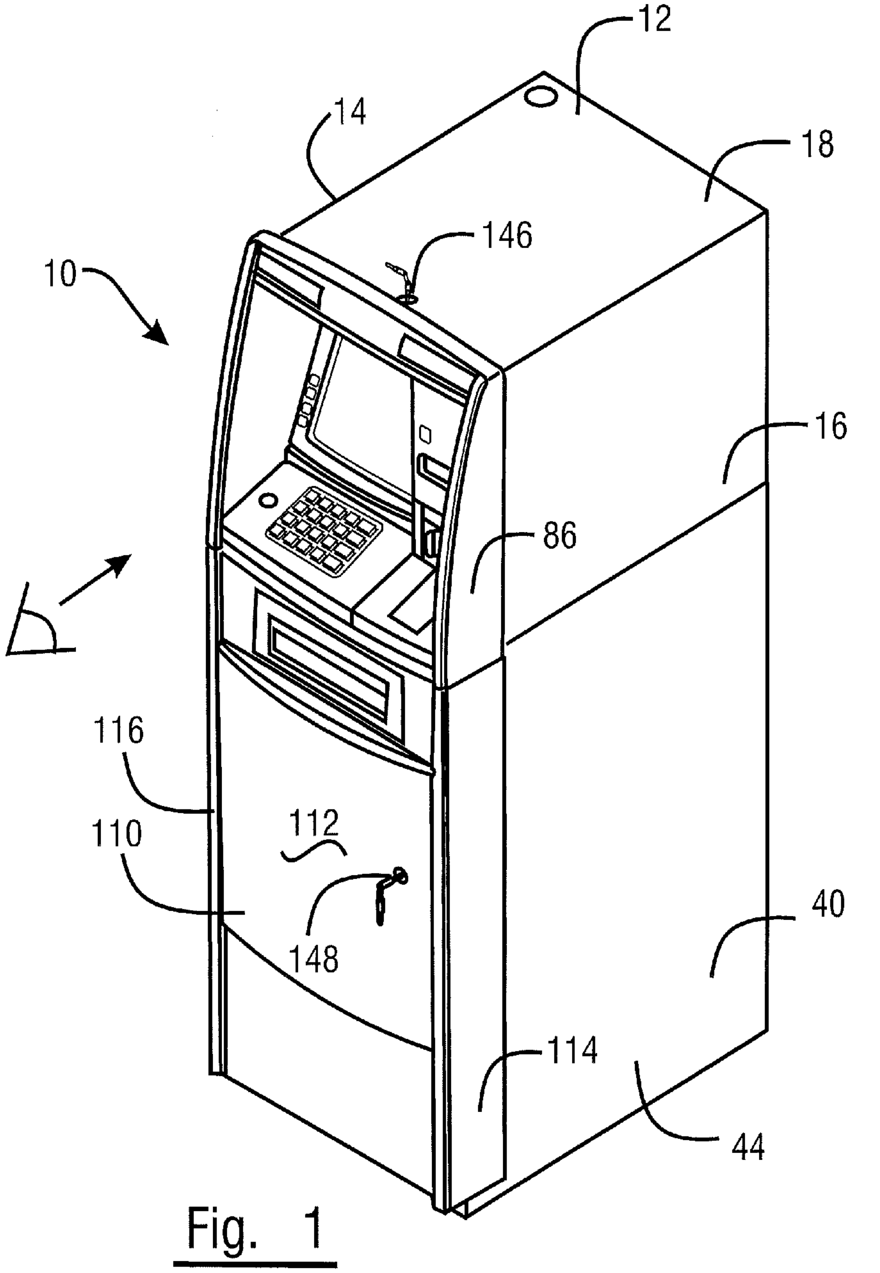
FIG. 1 is an isometric view of an automated banking machine of an exemplary embodiment.
Figure 2:
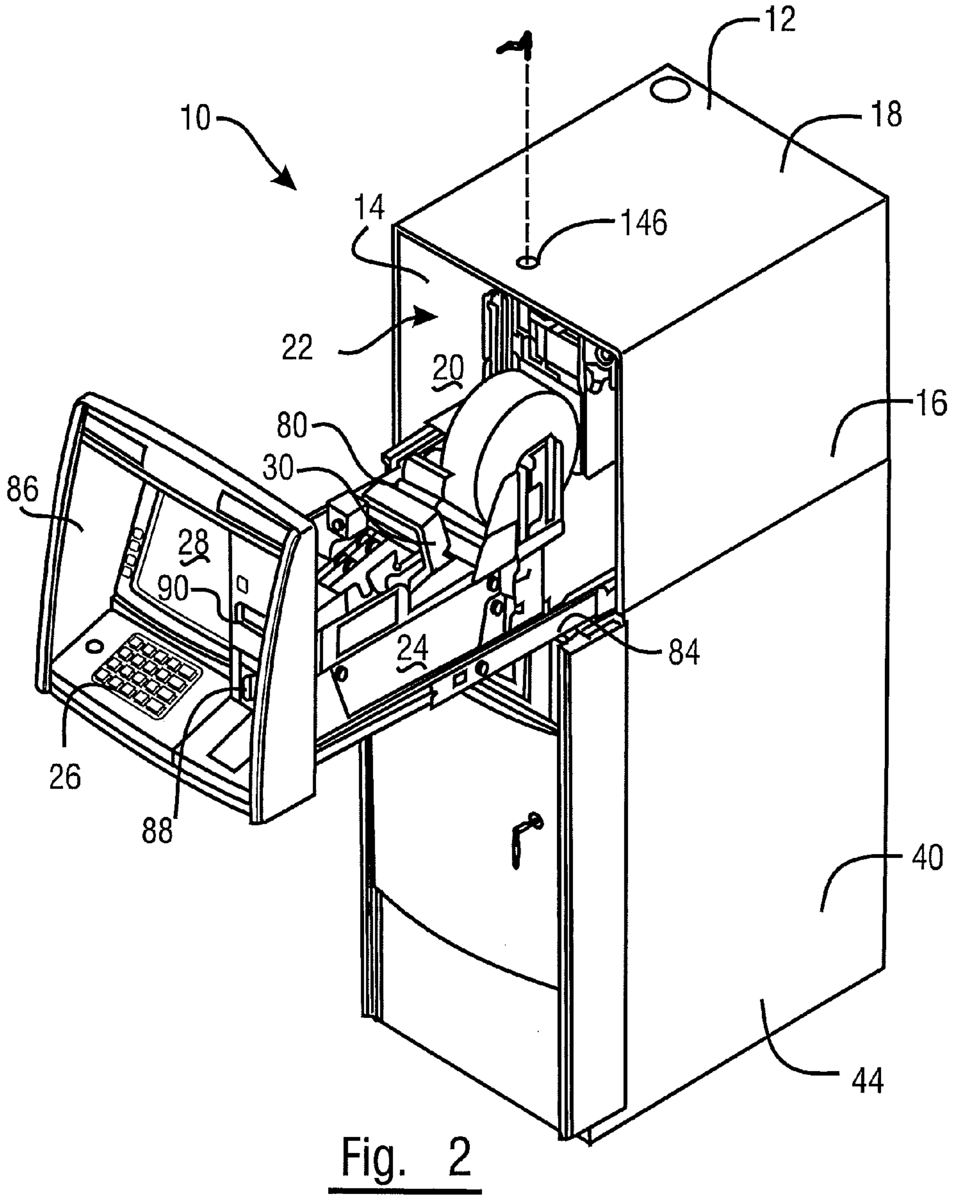
FIG. 2 is an isometric view of the automated banking machine of FIG. 1 with a rollout tray extended.

Referring now to the drawings, and particularly to FIGS. 1-2, there is shown therein an automated banking machine of a first exemplary embodiment, generally indicated 10. In this exemplary embodiment, automated banking machine 10 is an automated teller machine. Banking machine 10 includes a top housing 12 having side walls 14 and 16, and top wall 18. Housing 12 encloses an interior area indicated 20. Housing 12 has a front opening 22. In this exemplary embodiment, the rear of housing 12 is closed by a rear wall 19, shown in FIG. 7. However, in other embodiments, the rear of housing 12 may be accessible through an access door or similar device. Top housing 12 is used to house certain banking machine components such as input and output devices.

Figure 3:
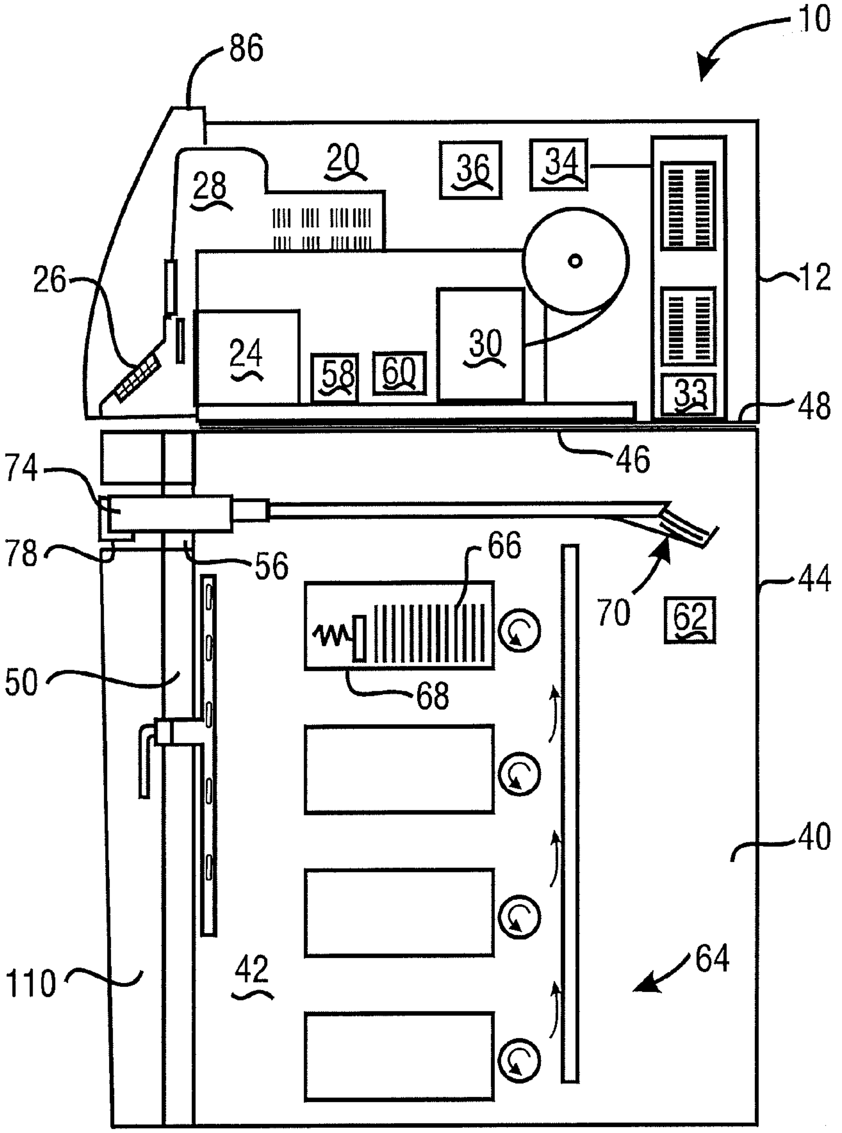
FIG. 3 is a side schematic view of an automated banking machine illustrating various banking machine components.

With reference to FIG. 3, in this exemplary embodiment the input devices include a card reader schematically indicated 24. The card reader is alternatively referred to herein as a module. Card reader 24 is operative to read a customer's card which includes indicia thereon. The indicia may correspond to information about the customer and/or information about a customer's financial account, such as the customer's account number. In some embodiments the card reader 24 may be a card reader adapted for reading magnetic stripe cards and/or so called “smart cards” which include a programmable memory. Other embodiments may read data from cards wirelessly such as RFID cards. Exemplary embodiments may include features of the types discussed in U.S. Pat. Nos. 7,118,031 and/or 7,333,954 the disclosures of which are incorporated herein by reference.

Another input device in the exemplary embodiment includes input keys 26. Input keys 26 may in embodiments, be arranged in a keypad or keyboard. Input keys 26 may alternately or in addition include function keys or other types of devices for receiving manual inputs. It should be understood that in various embodiments other types of input devices may be used such as biometric readers, speech or voice recognition devices, inductance type readers, IR type readers, and other devices capable of communicating with a person, article or computing device, radio frequency type readers and other types of devices which are capable of receiving information that identifies a customer and/or their account.

The exemplary embodiment of machine 10 also includes output devices providing outputs to the customer. In the exemplary embodiment machine 10 includes a display 28. Display 28 may include an LCD, CRT or other type display that is capable of providing visible indicia to a customer. In other embodiments output devices may include devices such as audio speakers, RF transmitters, IR transmitters or other types of devices that are capable of providing outputs which may be perceived by a user either directly or through use of a computing device, article or machine. It should be understood that embodiments may also include combined input and output devices such as a touch screen display which is capable of providing outputs to a user as well as receiving inputs.

The exemplary embodiment of the automated banking machine 10 also includes a receipt printer schematically indicated 30. The receipt printer is alternatively referred to herein as a module. The receipt printer is operative to print receipts for users reflecting transactions conducted at the machine. Embodiments may also include other types of printing mechanisms and modules such as statement printer mechanisms, ticket printing mechanisms, check printing mechanisms and other devices that operate to apply indicia to media in the course of performing transactions carried out with the machine.

Automated banking machine 10 further includes one or more processors schematically indicated 33. Processor 33, alternately referred to as a computer or a controller, is in operative connection with at least one memory or data store which is schematically indicated 34. The processor 33 is operative to carry out programmed instructions to achieve operation of the machine in accomplishing transactions. The processor 33 is in operative connection with a plurality of the transaction function devices included in the machine.

The exemplary embodiment includes at least one communications device 36. The communications device 36 may be one or more of a plurality of types of devices that enable the machine to communicate with other systems and devices for purposes of carrying out transactions. For example, communications device 36 may include a modem for communicating messages over a data line or wireless network, with one or more other computers that operate to transfer data representative of the transfer of funds in response to transactions conducted at the machine. Alternately the communications device 36 may include various types of network interfaces, line drivers or other devices suitable to enable communication between the machine 10 and other computers and systems. Exemplary embodiments may include features like those disclosed in U.S. Pat. No. 7,266,526 the disclosure of which is incorporated herein by reference.

Machine 10 further includes a safe or chest 40 enclosing a secure area 42. Secure area 42 is used in the exemplary embodiment to house critical components and valuable documents. Specifically in the exemplary embodiment secure area 42 is used for housing currency, currency dispensers, currency stackers, and other banking machine components. For purposes of this disclosure a cash dispenser shall include any mechanism that makes currency stored within the machine accessible from outside the machine. Cash dispensers may include features of the type disclosed in U.S. Pat. Nos. 7,261,236; 7,240,829; 7,114,006; 7,140,607 and 6,945,526 the disclosures of which are incorporated herein by reference.

Chest 40 includes a chest housing 44 including a top wall 46 having an upper surface 48 outside of the secure area 42. Top housing 12 is supported on the chest 40 such that the secure area 42 is generally below the interior area 20.

Chest 40 also includes a chest door 50 that is moveably mounted in supporting connection with the housing. Chest door 50, shown in the closed position in FIG. 4 and in an open condition in FIG. 5, is generally closed to secure the contents of the chest 40. In this exemplary embodiment, the chest door 50 is used to close a first opening 52 at a first end 54 of the chest housing 44. In other embodiments the chest opening and door may have other configurations. In the exemplary embodiment, chest door 50 includes a first device opening 56 therethrough and cooperates with mechanisms inside and outside the chest for passing currency or other items between a customer and devices located inside the chest 40.

Referring again to FIG. 3, machine 10 also includes a plurality of sensing devices for sensing various conditions in the machine. These various sensing devices are represented schematically by component 58 for simplicity and to facilitate understanding. It should be understood that a plurality of sensing devices is provided in the machine for sensing and indicating to the processor 33 the status of devices within the machine.

Exemplary automated banking machine 10 further includes a plurality of actuators schematically indicated 60 and 62. The actuators, which are alternatively referred to herein as drives, may comprise one or a combination of devices such as motors, solenoids, cylinders, rotary actuators and other types of devices that are operated responsive to the processor 33. It should be understood that numerous components within the automated banking machine are operated by actuators positioned in operative connection therewith. Actuators 60 and 62 are shown to schematically represent such actuators in the machine and to facilitate understanding.

Machine 10 further comprises at least one currency dispenser mechanism 64 which is alternatively referred to as a module, which during operation is housed in secure area 42. The currency dispensing mechanism 64 is operative responsive to the processor 33 to pick currency sheets from a stack of sheets 66 housed in one or more canisters 68. The picked currency sheets may be arranged by a currency stacker mechanism 70 for presentation through a delivery mechanism 74 which operates to present a stack of note or other documents to a customer.

When chest door 50 is in the closed position, at least an end portion of a sheet delivery mechanism 74 extends through first opening 56 in the chest door 50. In response to operation of the processor 33, when a desired number of currency sheets have been collected in a stack, the stack is moved through delivery mechanism 74.

As the sheets are moved through delivery mechanism 74 toward the first opening 56, the controller 32 operates a suitable actuating device to operate a gate 78 so as to enable the stack of sheets to pass outward through the opening. As a result the user is enabled to receive the sheets from the machine. After a user is sensed as having removed the stack from the opening, the controller may operate to close the gate 78 so as to minimize the risk of tampering with the machine.

Other exemplary embodiments may include other devices which may alternatively be referred to herein as module. Such devices may include currency recyclers and/or check acceptors. Such devices may include features like those shown in U.S. Pat. Nos. 7,461,777; 7,448,535; 7,448,536; 8,121,914; 8,118,217; 8,123,120; 8,123,122; 8,127,981; and 8,127,983, the disclosures of each which are incorporated herein by reference in their entirety.

With reference to FIG. 2, in this exemplary embodiment, machine 10 further includes a rollout tray 80. Rollout tray 80 is moveably mounted in supporting connection with slides 84. The slides 84 enable movement of the rollout tray 80 between the extended position shown in FIG. 2 and a retracted position within the interior area 20 of the top housing 12. Rollout tray 80 in the exemplary embodiment may be similar to that shown in U.S. Pat. No. 6,082,616, the disclosure of which is incorporated by reference as if fully rewritten herein.

Rollout tray 80 may have several upper banking machine components supported thereon including card reader 24, input keys 26, display 28, receipt printer 30, and other components as appropriate for the particular machine 10.

This exemplary embodiment further includes an upper fascia 86 in supporting connection with rollout tray 80. The upper fascia 86 may include user interface openings such as a card opening 88 through which a customer operating the machine 10 may insert a credit, debit or other card, or a receipt delivery slot 90 through which printed transactions receipts may be delivered to the customer. Rollout tray 80 moveably supports upper fascia 86 relative to the top housing 12 so that upper fascia 86 is movable between a first position covering the front opening and a second position in which the upper fascia is disposed from the front opening 22.

As illustrated in FIG. 1, in the operative condition of machine 10, the rollout tray 80 is retracted into the interior area 20 of the housing 12. Upper fascia 86 operates to close front opening 22 and provide an attractive appearance for machine 10, while allowing a customer to input information and receive outputs from machine 10.

Figure 6:
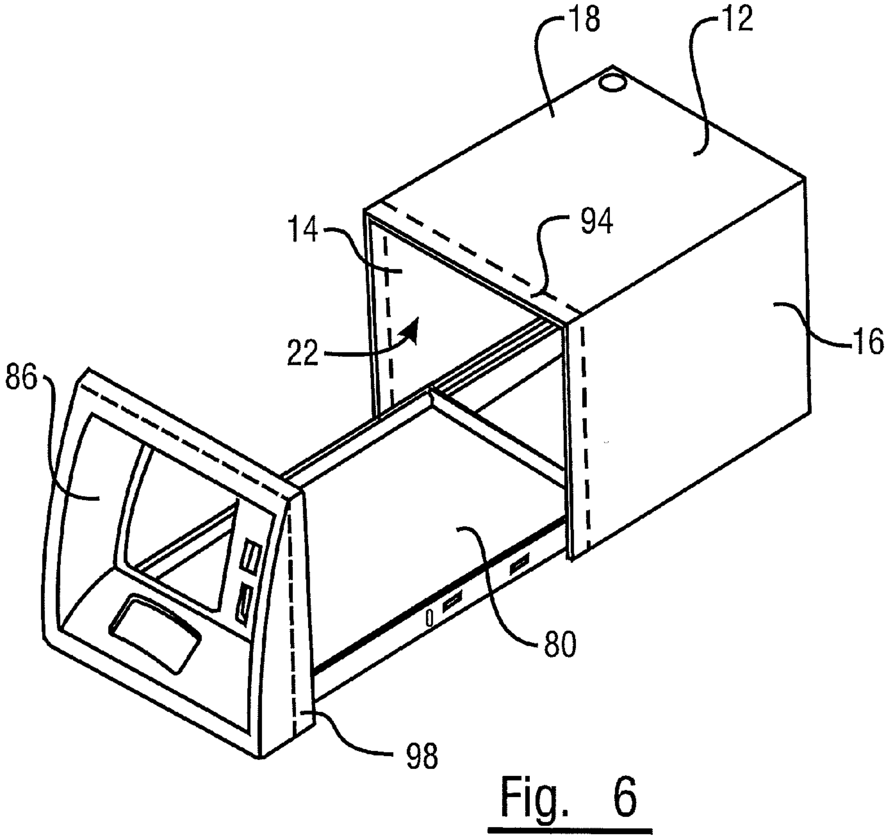
FIG. 6 is an isometric view of a top housing for an automated banking machine supporting a rollout tray in an extended position.

With reference to FIG. 6, in this exemplary embodiment, the forward-most parts of side walls 14 and 16 and top wall 18 of housing 12 define a forward region 94, shown in dashed lines, bounding the front opening 22. In this exemplary embodiment, upper fascia 86 includes a rearwardly extending portion 98, also shown in dashed lines. Rearwardly extending portion 98 is dimensioned to overlie in generally surrounding relation, the forward region 94 when rollout tray 80 is retracted and upper fascia 86 is in the first position. In some embodiments the rearwardly extending portion may be contoured or tapered so as to extend further inwardly with increasing proximity to the front of the fascia. Such tapered control may engage and help to close and/or align the fascia and the top housing 12.

Figure 7:
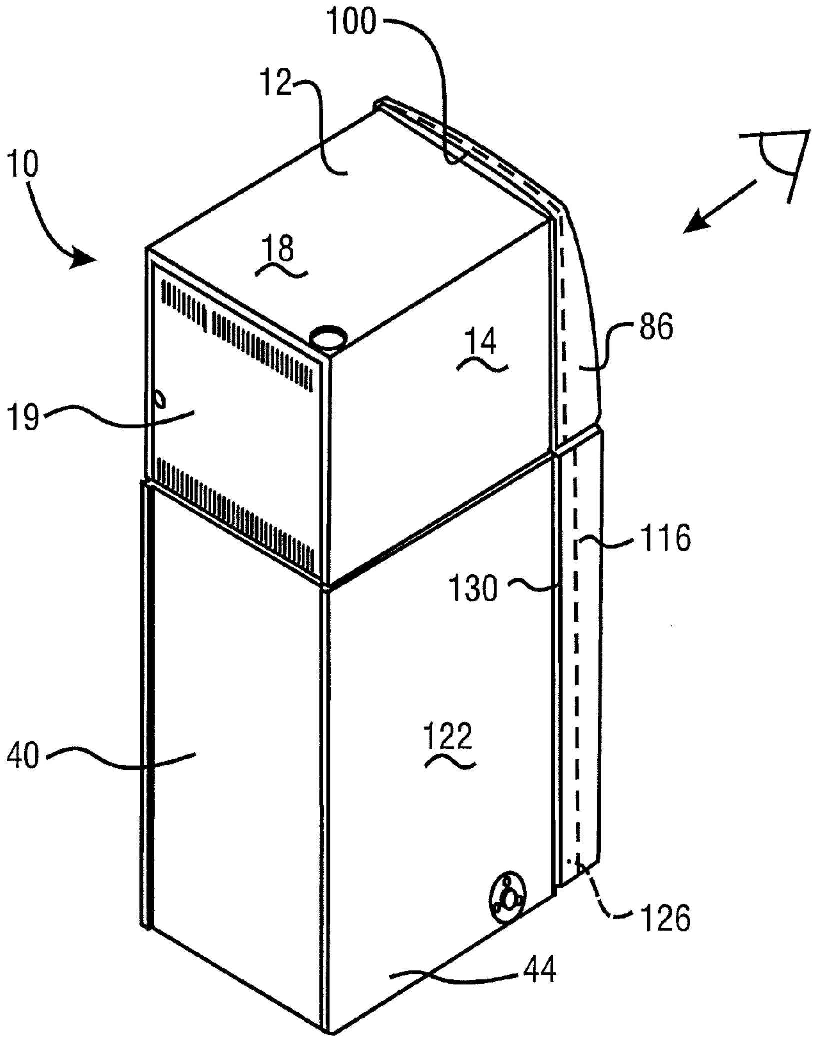
FIG. 7 is an isometric rear view of the automated banking machine of FIG. 1.

With reference to FIG. 7, when machine 10 is viewed from the rear, there may be a first gap 100 separating the rearwardly extending portion 98 of upper fascia 86 from the top housing 12. In some embodiments it may be desirable that first gap 100 be minimal to prevent unauthorized access to interior area 20. First gap 100 in the exemplary embodiment is not visible when machine 10 is viewed from the front.

In this exemplary embodiment, the upper fascia 86 is formed of a plastic material and the top housing 12 is formed of sheet metal. Alternately, the extending portion 98 or forward portion 94 shown in FIG. 6, or both, may include resilient materials to provide for engagement and sealing of the housing and the fascia in the closed position. However, other materials may be chosen, and these approaches are exemplary.

Figure 4:
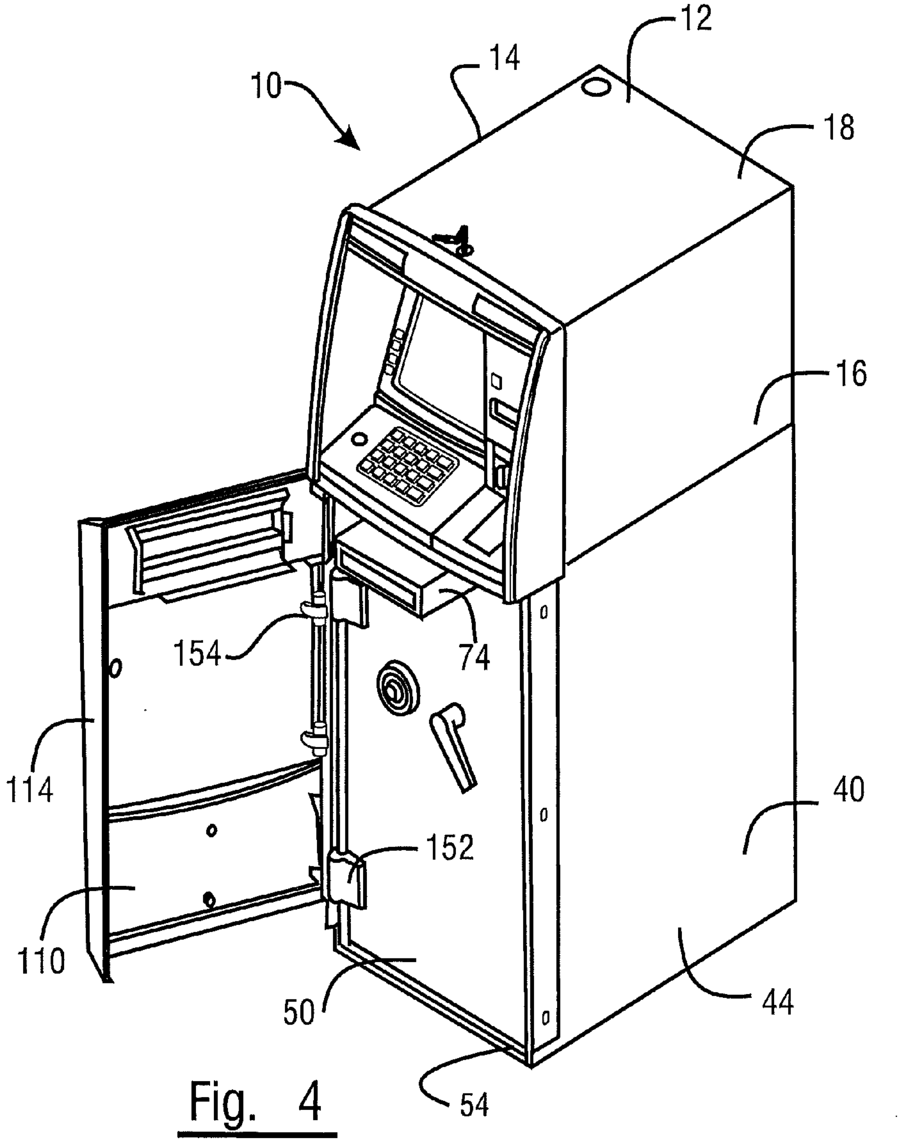
FIG. 4 is an isometric view of the automated banking machine of FIG. 1 with a lower fascia in an accessible position.
Figure 5:
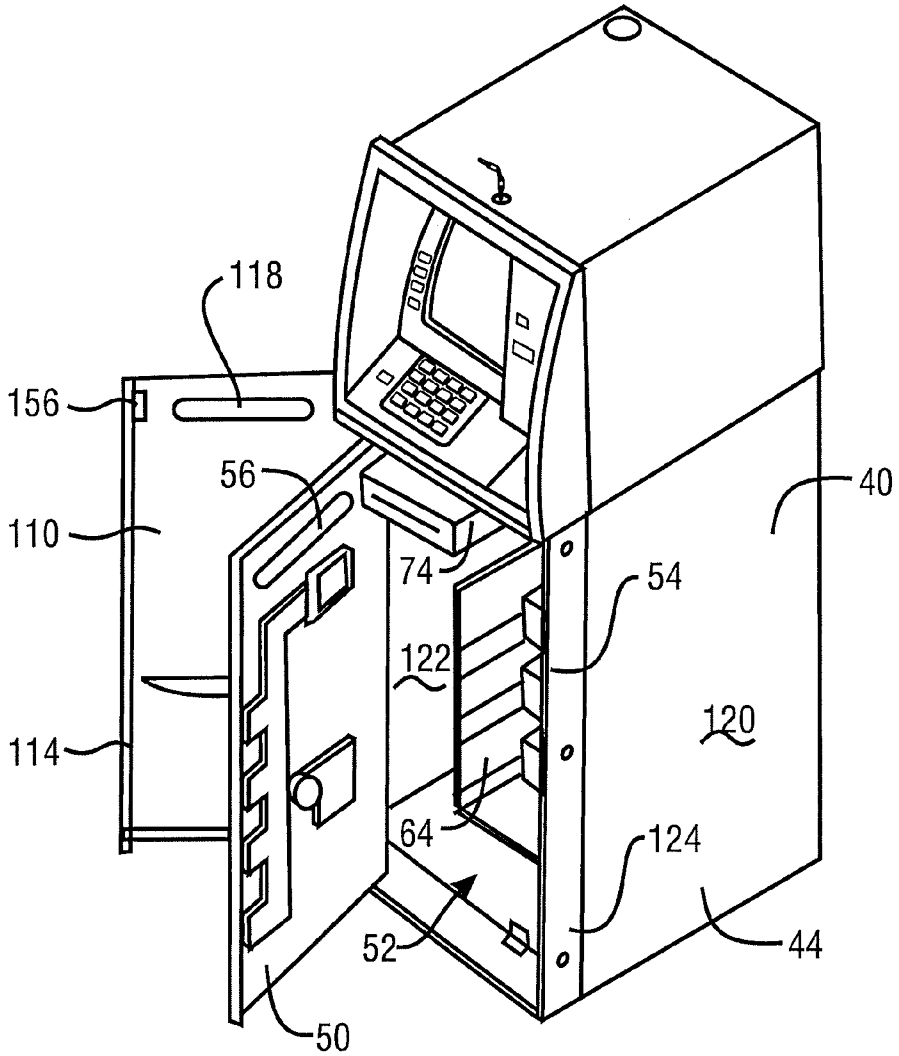
FIG. 5 is an isometric view of the automated banking machine of FIG. 1 with a lower fascia in an accessible position and a chest door in an open position.

With reference to FIGS. 1, 4 and 5, the exemplary embodiment further includes a lower fascia 110 moveably mounted on the chest housing 44. In this exemplary embodiment, lower fascia 110 is operable to move between a covering position as illustrated in FIG. 1, and an accessible position as illustrated in FIGS. 4-5. In other applications, it may be preferable to provide a selectively removable lower fascia, or other approaches to supporting the lower fascia on the chest portion.

The exemplary lower fascia 110 operates to cover the chest 40 to thereby provide a more attractive appearance to machine 10. In the exemplary embodiment, lower fascia 110 includes a front face 112 and first and second side extensions 114, 116, respectively.

In the exemplary embodiment, illustrated in FIGS. 5 and 7, chest housing 44 includes first and second side walls 120, 122, respectively. First side wall 120 includes a forward portion 124 and second side wall includes a forward portion 126 (shown in phantom in FIG. 7). When the chest door 50 is in the closed position and the lower fascia 110 is in the covering position, the first and second side extensions 114, 116, respectively, overlie forward portions 124, 126.

Thus, when machine 10 is viewed from the front (see FIG. 1), the lower fascia 110 covers the chest 40 from side to side. When machine 10 is viewed from the rear (see FIG. 7), a lower gap (not shown) between the first side extension 114 and the first side wall 120 of the chest housing 44 and a lower gap 130 between the second side extension and 116 the second side wall 122 may be visible, although such lower gaps are not viewable from the front of machine 10. In some applications, it may be desirable to minimize the lower gaps 130.

Figure 8:
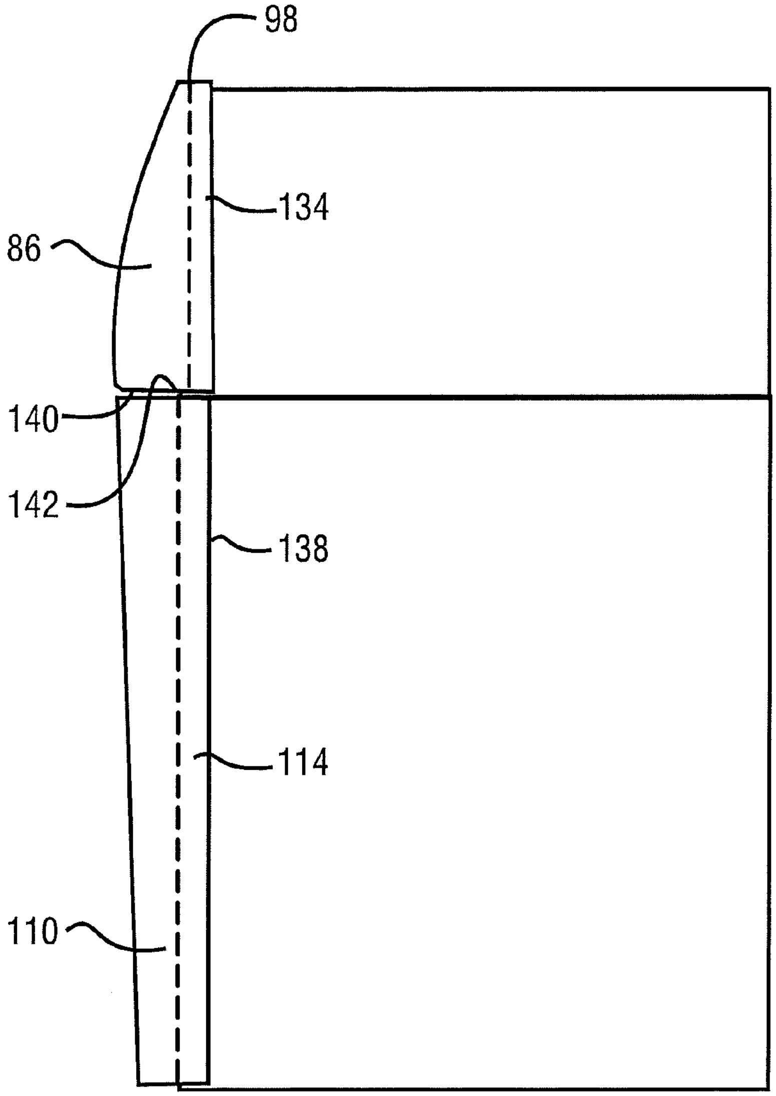
FIG. 8 is a side schematic view of an exemplary embodiment of an automated banking machine illustrating the alignment of an upper fascia and a lower fascia.

As best illustrated in FIG. 8, in the exemplary embodiment, the rearwardly extending portion 98 of upper fascia 86 includes a rearward facing end edge 134. Also, in the exemplary embodiment, first side extension 114 of lower fascia 110 includes rearward facing end edge 138. When viewed from the first side of machine 10, in the exemplary embodiment, end edge 134 of upper fascia 86 and end edge 138 of lower fascia 110 are substantially vertically aligned along a first side of machine 10 when the upper fascia 86 is in the first position and the lower fascia 110 is in the covering position.

With continued reference to FIG. 8, in the exemplary embodiment, upper fascia 86 is bounded by a lower surface 140. Lower fascia 110 is bounded by an upper surface 142. In the exemplary embodiment, lower surface 140 is adapted for substantial parallel horizontal alignment with upper surface 142 when the upper fascia 86 is in the first position and the lower fascia 110 is in the covering position. The alignment of the fascia surfaces presents an attractive appearance to machine 10.

In this exemplary embodiment, the rearwardly extending portion 98 further operates to simplify the manufacture and assembly of the machine 10. In some previous machines, it was necessary to more precisely control the alignment of the walls of the upper fascia 86 with the perimeter of the front opening. However, in this disclosed exemplary embodiment, because the rearwardly extending portion 98 overlies the forward region 94, the required precision is lessened. Further, in those embodiments which include a tapered engagement, alignment of the top housing 12 and upper fascia 86 is facilitated.

With particular reference to FIG. 5, lower fascia 110 may include an access opening 118 therein. In this exemplary embodiment, access opening 118 in the lower fascia 110 is adapted to be substantially aligned with first device opening 56 in chest door 50 when chest door is closed and lower fascia 110 is in the covering position. In this exemplary embodiment, when the chest door 50 is closed and lower fascia 110 is in the covering position, at least an end portion of sheet delivery mechanism 74 extends in the first device opening 56 in chest door 50 and access opening 118 in lower fascia 110.

As illustrated in FIGS. 1 and 2, in this exemplary embodiment, machine 10 includes a first locking mechanism 146 for selectively retaining the rollout tray 80 in the retracted position when upper fascia 86 covers the front opening 22. The first locking mechanism may be of the type described in U.S. Pat. No. 6,082,616 previously incorporated herein.

In the exemplary embodiment, machine 10 also includes a second locking mechanism 148 for selectively securing lower fascia 110 in the covering position.

Figure 9:
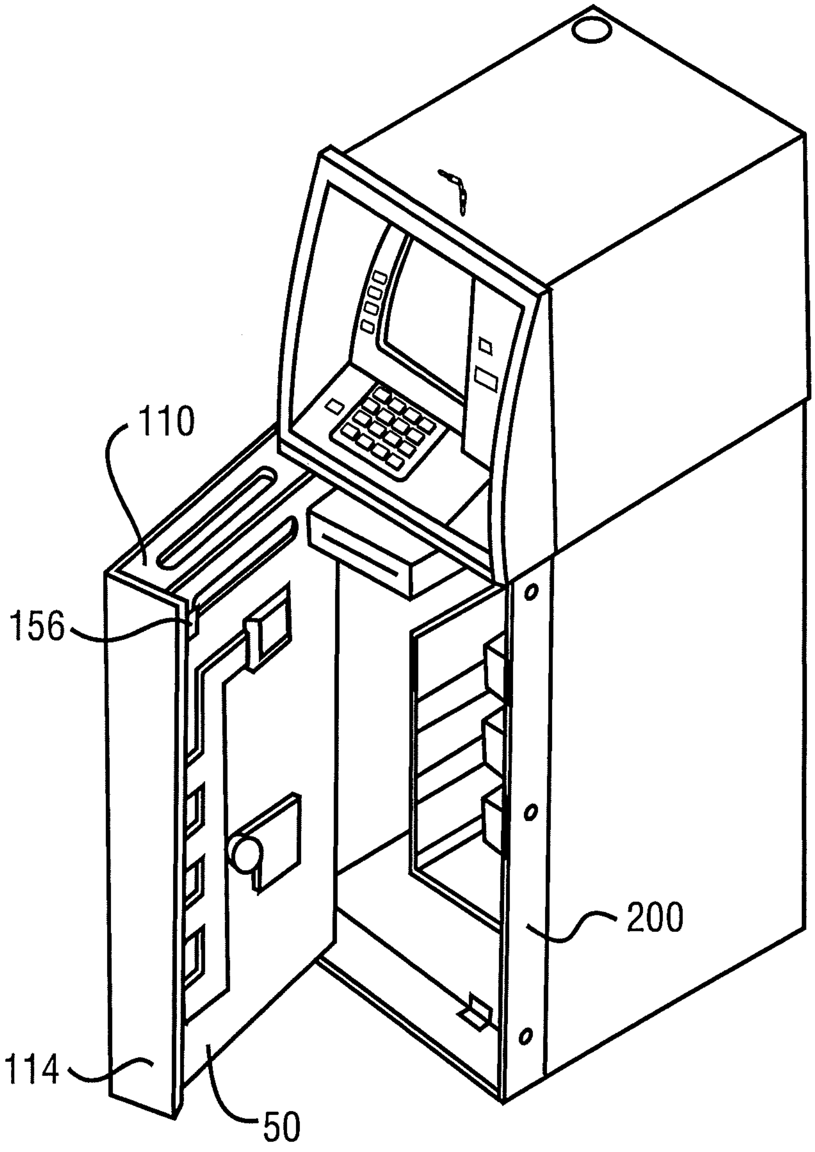
FIG. 9 is an isometric view of an automated banking machine similar to FIG. 5 showing the chest door selectively engaged with the lower fascia.

With particular reference to FIGS. 4, 5 and 9, in another exemplary embodiment machine 10 may include a top housing 12 as previously described. Machine 10 further includes chest 40 having chest door 50 mounted to the housing 44 by one or more chest door hinge assemblies 152. Lower fascia 110 is moveably mounted to chest housing 44 by one or more fascia hinges 154. In this exemplary embodiment, fascia hinge 154 and chest door hinge assembly 152 are situated on the same side of the chest housing 44 so that lower fascia 110 and chest door 50 pivot generally in the same direction relative to the chest.

From time to time, the banking machine components enclosed within secure enclosure 42 must be accessed for replenishment or other servicing activity. Thus, lower fascia 110 may be selectively moved from a covering position into an accessible position to allow access to chest door 50. Chest door 50 may then be selectively opened.

In this exemplary embodiment, as best seen in FIG. 9, lower fascia 110 is operable to engage the open chest door 50 to prevent its movement back to a closed position. In this exemplary embodiment, lower fascia 110 includes an inwardly directed flange 156 carried on an inner surface at a side opposite the fascia hinge 154. Inwardly directed flange 156 is dimensioned to engage at least a portion of chest door 50 when the lower fascia 110 is in the accessible position and the chest door 50 is in the open position. In the exemplary embodiment, lower fascia 110 is adapted to pivot away from the chest door 50 to at least an extent where the chest door may be disengaged from inwardly directed flange 156. Exemplary embodiments may include features of the type discussed in U.S. Pat. Nos. 7,159,767; 7,152,784; 7,000,830; and 6,871,602 the disclosures of which are incorporated herein by reference.

An exemplary embodiment includes a method for accessing the contents of the secure area for servicing components housed therein or to replenish currency sheets. The method includes placing the lower fascia into an accessible position from a covering position to uncover the chest door; opening the chest door to provide access to the secure area through an opening in the chest housing; and engaging the chest door and the lower fascia to hold the chest door in an open condition. Thus a currency dispenser mechanism or other components may be accessed.

Servicing the currency dispenser may include adding or removing currency sheets from operative engagement with the currency dispenser mechanism.

The method may further include engaging the chest door with an inwardly directed flange that is mounted in supporting connection with the lower fascia.

To return the machine to an operational condition, the method includes moving the lower fascia outwardly relative to the engaged chest door to disengage the chest door; closing the chest door; and repositioning the lower fascia into the covering position.

Repositioning the lower fascia into the covering position includes overlying a first forward portion of the chest housing with a first side extension of the lower fascia and overlying a second forward portion of the chest housing with a second side extension of the lower fascia.

Prior to placing the lower fascia into the accessible position, the method includes unlocking a first locking mechanism operable to selectively retain the lower fascia in a covering position.

Figure 10:
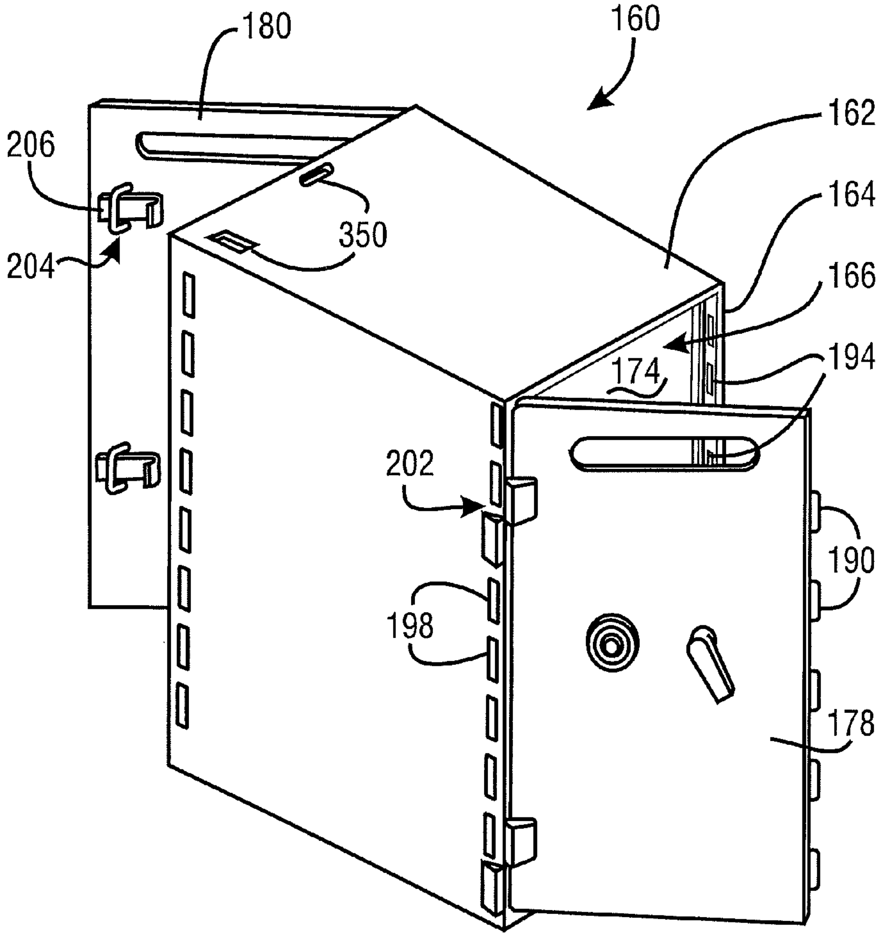
FIG. 10 is a schematic view of an alternate embodiment of a chest for an automated banking machine, as viewed from the front.
Figure 11:
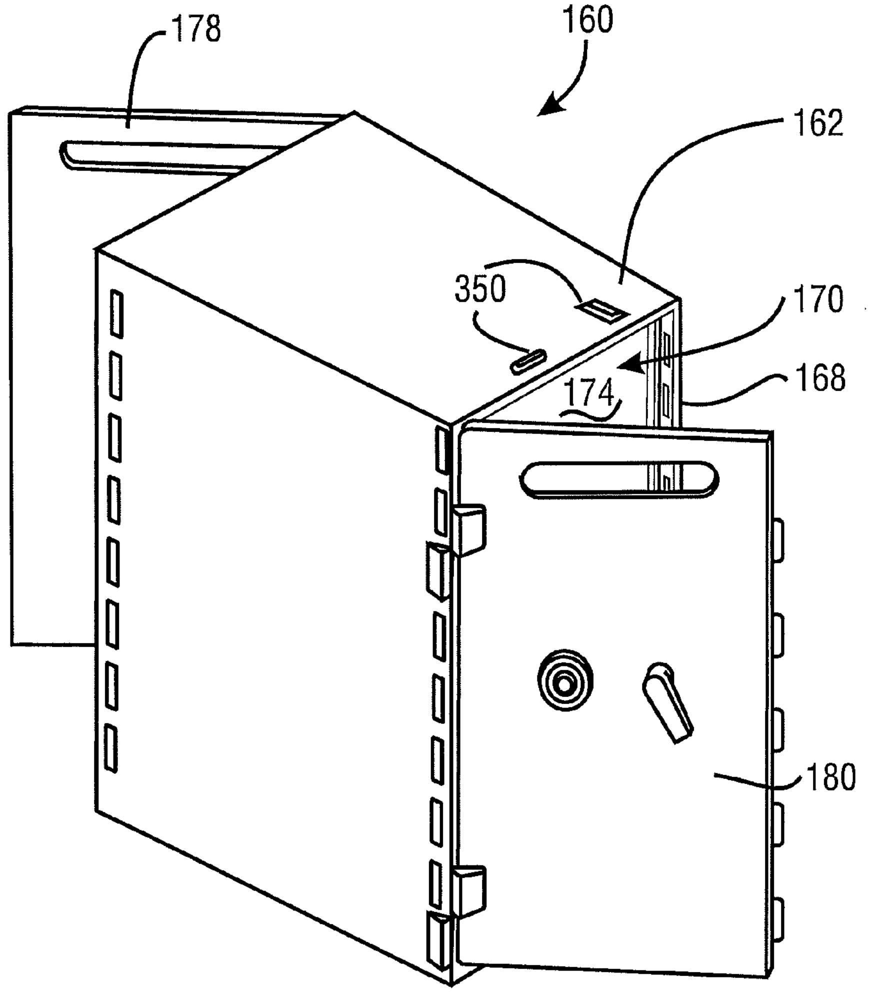
FIG. 11 is a schematic view of the alternate embodiment of the chest shown in FIG. 10, as viewed from the rear.

Some machines may be equipped with another exemplary embodiment of a chest or safe 160, as best seen in FIGS. 10-11. Chest 160 includes a chest housing 162 having first end 164 defining a first opening 166 therein and second end 168 defining a second opening 170 therein. The chest of this exemplary embodiment is particularly adapted for applications wherein a common chest housing can be utilized in either “front-load” machines or “rear-load” machines. By “front-load” machine it is meant that access to a secure area 174 in an operable machine may be selectively attained from the front of the machine, which is the same side that customers use to provide input to the machine. By “rear-load” machine it is meant that access to the secure area 174 in an operable machine may be selectively attained from the rear of the machine, while customer inputs are provided at the front of the machine.

In this exemplary embodiment, chest 160 includes a first chest door 178 moveably mounted adjacent a first end 164 of chest housing 162 to selectively close the first opening 166. Chest 160 further includes a second chest door 180 moveably mounted adjacent the second end 168 to selectively close the second opening 170.

In the exemplary embodiment illustrated in FIG. 10, chest 160 is adapted for use in a front load machine wherein under usual operating conditions, first chest door 178 is selectively movable to open or close first opening 166 to allow access to secure area 174. In this exemplary embodiment, second chest door 180 is adapted to remain closed during usual operation of the machine, including those times when access to secure area 174 is desired. For purposes of this disclosure, the term “semi-permanently” closed is used to describe a condition of a chest door that closes an opening in the chest housing in a manner that does not readily permit access to the secure area. In this way, a “semi-permanently” closed chest door is not used as the primary means for accessing the chest interior. However, under appropriate conditions the semi-permanently closed chest door can be opened.

In this exemplary embodiment, first chest door 178 is the operable door and second chest door 180 is adapted to be semi-permanently closed. In other embodiments, for instance in rear-load machines, it may be desirable to utilize chest 160 as illustrated in FIG. 11 where the second chest door 180 is the operable door while first chest door 178 is adapted to be semi-permanently closed.

Figure 12:
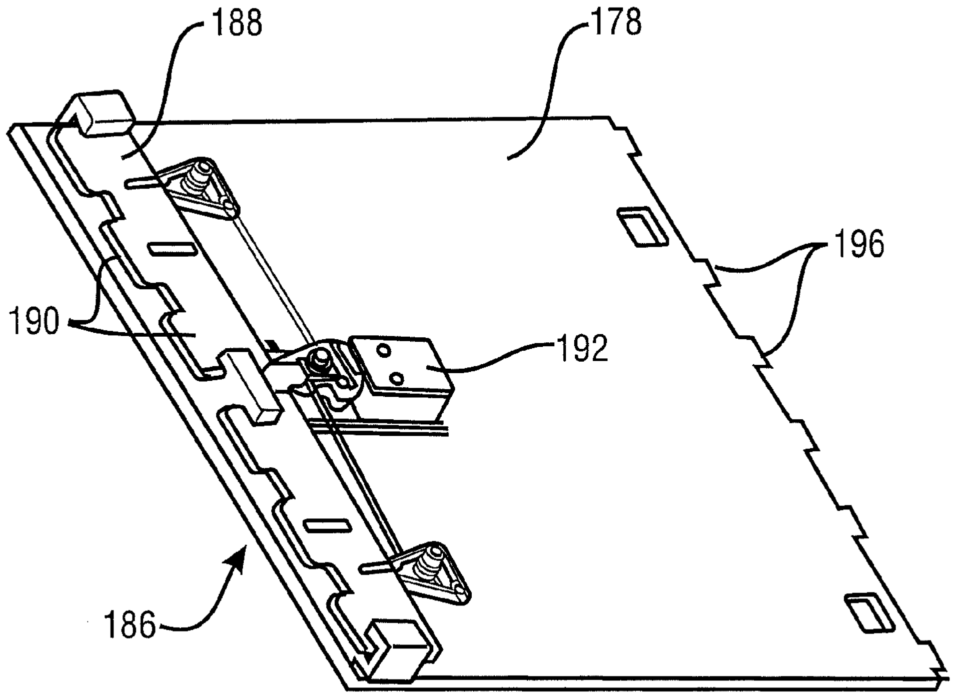
FIG. 12 is an isometric view of a chest door illustrating a locking bolt mechanism.

With particular reference to FIGS. 10 and 12, in the exemplary embodiment, the first chest door 178 is equipped with a suitable locking bolt mechanism generally denoted 186.

Locking bolt mechanism 186 is operative to selectively enable securing first chest door 178 in a locked condition. Locking bolt mechanism 186 may be of the type described in U.S. Pat. No. 6,089,168 which is incorporated by reference as if fully rewritten herein. Of course, other suitable bolt works can be utilized to accomplish the objectives.

Locking bolt mechanism 186 of the exemplary embodiment includes a locking bolt 188 which includes a plurality of locking bolt projections 190. Locking bolt 188 is mounted in operatively separated connection with an interior surface of first chest door 178 so as to be slideably movable between an extended position and a retracted position.

First chest door 178 also has a lock 192 mounted thereto. Lock 192 cooperates with locking bolt mechanism 186 so that first chest door 178 is enabled to be changed from a locked condition to an unlocked condition. As shown in FIG. 10, the chest housing 162 includes a plurality of vertically spaced locking bolt apertures 194 which are sized and positioned for accepting the locking bolt projections 190.

It will be appreciated by those skilled in the art that the locking bolt mechanism because it provides multiple places for engagement with the chest housing, achieves more secure locking of the door in the closed position than a locking bolt mechanism providing a single place for engagement with the chest housing.

In the exemplary embodiment, first chest door 178 includes a plurality of dead bolt projections 196 extending on a hinge side of the door. These dead bolt projections 196 are preferably positioned and sized to be accepted in the dead bolt apertures 198 in housing 162. As will be appreciated, the acceptance of the dead bolt projections 196 into the dead bolt apertures 198 provides enhanced security. In an exemplary embodiment, the dead bolt apertures and the locking bolt apertures are covered by trim pieces 200 (shown in FIG. 9) that extend on the outside of the housing.

With reference to FIG. 10, in the exemplary embodiment, the first chest door 178 is operably connected to the chest housing via one or more first chest hinge assemblies 202. The exemplary chest hinge assembly 202 may be of the type described in U.S. Pat. Nos. 6,089,168 and/or 7,156,297 previously incorporated. It will be readily understood that other hinge constructions may be used in other embodiments.

In the exemplary embodiment, the second chest door 180 may be secured in a closed position by a securing mechanism that generally mirrors the locking bolt mechanism 186 and lock 192. Alternately, as illustrated in FIG. 10, second chest door 180 may be "semi-permanently" secured by an alternate securing mechanism 204. The alternate securing mechanism 204 may include a bolt member 206 or other mechanism that is less complex than the locking bolt mechanism and lock previously described. In this exemplary embodiment, routine access to the secure area 174 via second chest door 180 is not necessary during normal operation of the machine. Thus, the alternate securing mechanism 204 is operable to "semi-permanently" engage the chest door 180. This may be done, for example, by securing the bolt with fasteners or other devices that are only accessible from within the interior of the chest portion. Of course, in some alternative embodiments both chest doors may be equipped with operational locking bolt mechanisms and locks.

The manufacture of an exemplary machine may be simplified by use of chest 160. A common chest housing may be utilized in applications requiring a front-load machine or a rear-load machine. After the housing has been assembled, the positioning of a locking bolt mechanism may be chosen according to the configuration of the chest. Additionally, at a subsequent time, the operational features may be changed so that the initial operational chest door becomes the non-operational door and vice versa. Thus, the manufacturing process is simplified by the versatility of the chest housing.

Of course it will be readily appreciated that machines incorporating this exemplary embodiment of chest 160 may include any of the other features described elsewhere.

An exemplary embodiment includes a method for utilizing a machine that is equipped with a chest having two opposed openings. The chest housing includes a first opening at a first end thereof and a second opening at a second opposed end. The first door is moveably mounted in supporting connection with the chest housing so that the first chest door is operative to selectively close the first opening. A second chest door is moveably mounted in supporting connection with the chest housing so that the second door is operative to semi-permanently close the second opening. At least one lower banking machine component is mounted in supporting connection with the chest housing in the secure area.

In the exemplary method, a first locking bolt mechanism in supporting connection with the first chest door is operated to selectively securely engage the first chest door with the chest housing. A first securing mechanism in supporting connection with the second chest door is operated to semi-permanently securely engage the second chest door with the chest housing.

The method includes accessing at least one lower banking machine component of a machine through a first opening in a chest housing bounding a secure area; and preventing access to the at least one lower banking machine component through the second opening.

The method further includes replacing the first locking bolt mechanism with a second securing mechanism in supporting connection with the first chest door, wherein the second securing mechanism is operative to semi-permanently securely engage the first chest door with the chest housing; and replacing the first securing mechanism with a second locking bolt mechanism in supporting connection with the second chest door, wherein the second locking bolt mechanism is operative to selectively securely engage the second chest door with the chest housing. Thus, the door chosen as the operative door can be selected and changed.

The exemplary machine may include a lower fascia that is mounted in supporting connection with the chest housing, wherein the lower fascia is selectively movable between a covering position and an accessible position. The exemplary method may include moving the lower fascia from the covering position to the accessible position prior to accessing the lower banking machine component. Further, the method may include engaging the first chest door with the lower fascia to hold the first door in the open condition.

The at least one lower banking machine component may comprise a currency dispenser mechanism or module. The exemplary method includes servicing the currency dispenser mechanism after the at least one lower banking machine component is accessed. This may include for example features included in U.S. Pat. Nos. 7,195,237 and/or 7,111,776 the disclosures of which are incorporated herein by reference.

The at least one lower banking machine component may comprise a currency stacker. The exemplary method includes servicing the currency stacker.

Figure 13:
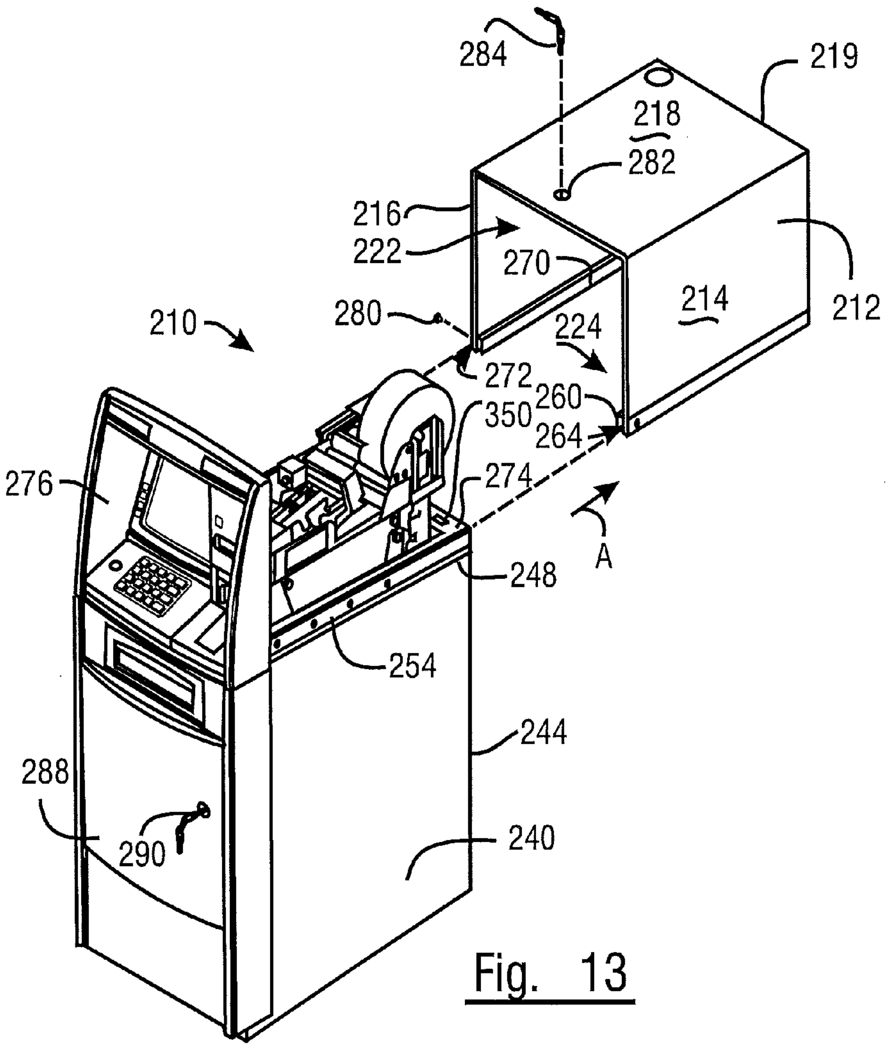
FIG. 13 is an isometric exploded view of an alternate embodiment of an automated banking machine.
Figure 14:
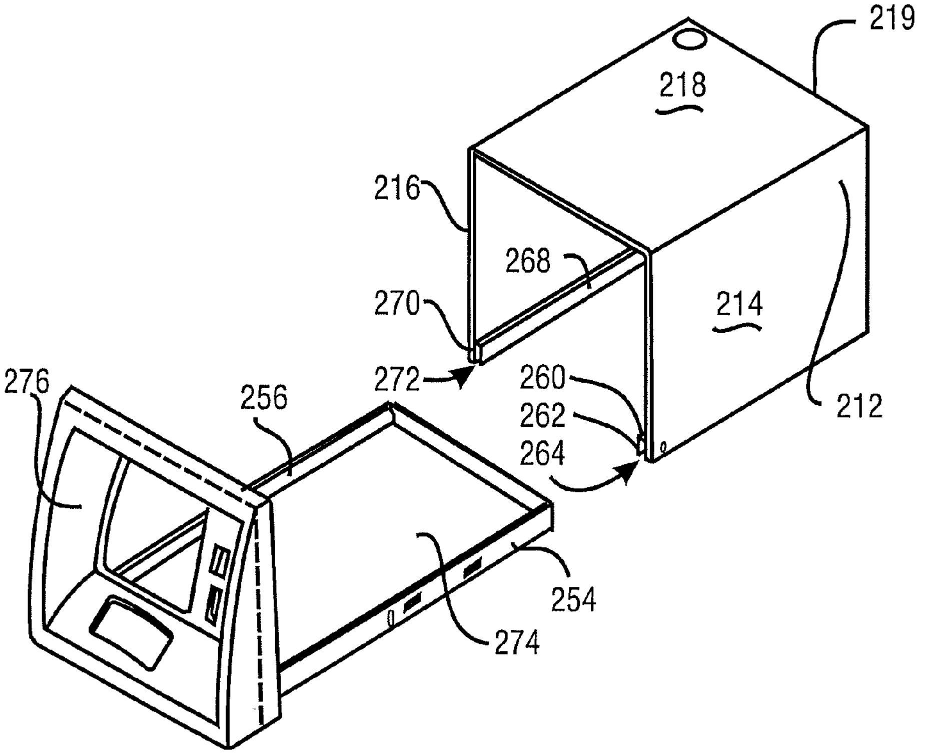
FIG. 14 is an isometric view of a top housing cover, a mounting tray and an upper fascia of an automated banking machine.
Figure 15:
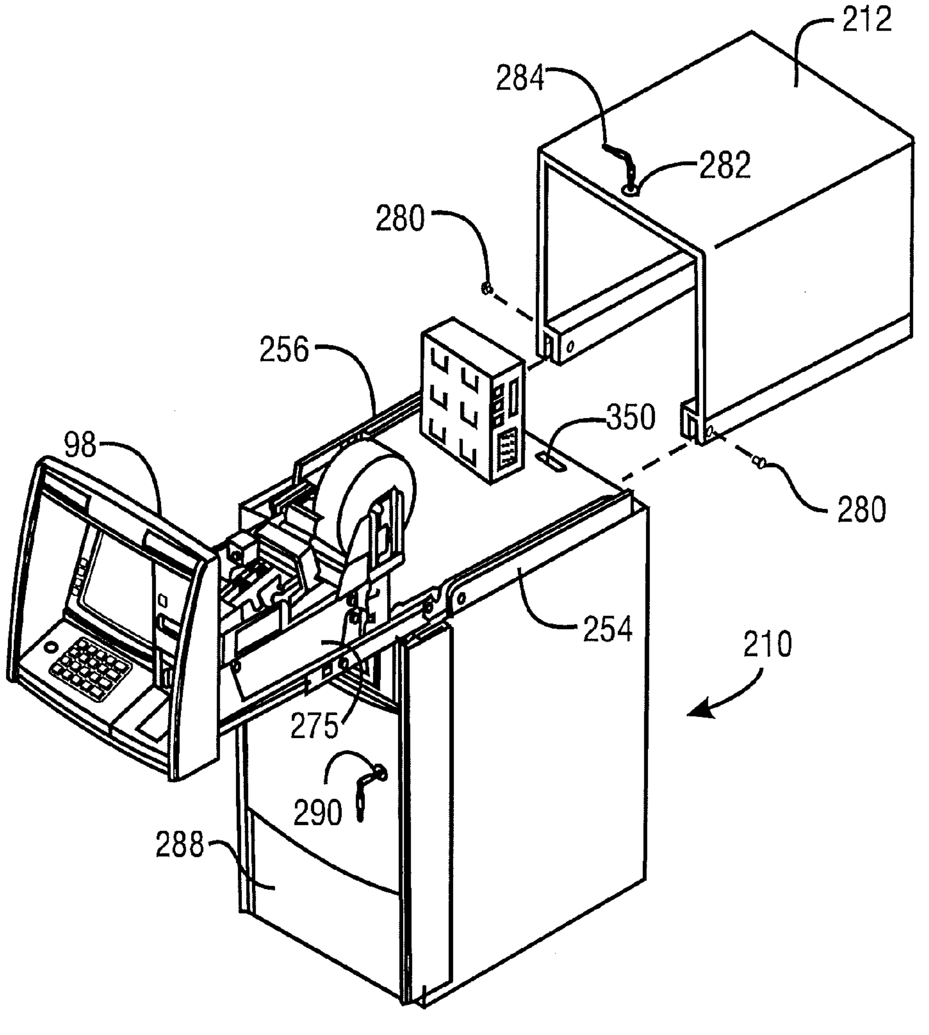
FIG. 15 is an isometric view of an alternate embodiment of an automated banking machine.

Yet another exemplary embodiment of a machine 210 is illustrated in FIGS. 13-15. Machine 210 includes a top housing cover 212 including first and second side walls 214, 216, top wall 218, and rear wall 219. Top housing cover 212 defines a front opening 222 and a bottom opening 224. In a first (operable) position, top housing cover 212 covers an interior area in which various upper banking machine components such as a display, a receipt printer, a card reader, input keys, a controller, communication device, and others may be disposed.

In this exemplary embodiment, machine 210 further includes a chest 240 bounding a secure area in a manner similar to that previously described. Chest 240 includes a housing 244 having a top wall 248. Top housing cover 212 is adapted for rearward slidable movement relative to top wall 248 to a second position for service.

In this exemplary embodiment, a first upwardly extending flange member 254 is mounted in supporting connection with top wall 248 along a first side thereof. A second upwardly extending flange member 256 (not shown in this view) is mounted in supporting connection with top wall 248 along a second side thereof.

Supported on the first side wall 214 of top housing cover 212 is a first cooperating channel member 260 having a pair of spaced downwardly extending projections 262 defining a first channel 264 therebetween. Likewise, on the second side wall 216 of top housing cover 212 there is supported a second cooperating channel member 268 having a pair of spaced downwardly extending projections 270 defining a second channel 272 therebetween.

Top housing cover 212 is adapted for slidable movement relative to the top wall 248 by the slidable engagement of the first flange member 254 within first channel 264 and the slidable engagement of the second flange member 256 within second channel 272.

In this exemplary embodiment, machine 210 includes an upper fascia 276 operable to selectively cover the front opening 222. The top housing cover 212 is adapted for rearward movement relative to the top wall 248 in the direction of arrow A such that rearward displacement of the top housing cover 212 allows access to the upper banking machine components in the interior area, for example, for servicing.

It is contemplated that in exemplary embodiments the positioning of the flange members 254, 256 and the channels 264, 272 be reversed. For example, the top housing cover 212 may support flange members and the mounting tray may support cooperating channel members to accomplish a similar slidable relationship therebetween.

FIG. 14 illustrates an exemplary embodiment wherein the flange members 254, 256 are incorporated into a mounting tray 274 which is operable to receive and support one or more upper banking machine components, which for ease of illustration are not shown in this view. This embodiment allows for ease of assembly of the exemplary machine 210. The applicable upper banking machine components can be readily mounted onto mounting tray 274, which is mounted in supporting connection with top wall 248 of chest housing 244. Top housing cover 212 may thereafter be positioned by slidable movement of flange members 254, 256 in respective channels 264, 272.

In an alternate exemplary embodiment, illustrated in FIG. 15, machine 210 may include a rollout tray 275 similar to rollout tray 80 as previously described. Flange members 254, 256 may be mounted in supporting connection with rollout tray 275. Thus, upper banking machine components may be accessed by rearwardly sliding the top housing cover 212, extending the rollout tray 275, or a combination of both.

Machine 210 may further include at least one removable fastener 280 for selectively engaging the top housing cover 212 with at least one flange member 254, 256 to prevent relative slidable movement therebetween. In the exemplary embodiment, first and second fasteners 280 are used to secure the top housing cover 212.

Machine 210 may further include a first locking mechanism 282 to secure the top housing cover to upper fascia 276. In this exemplary embodiment, the locking mechanism is operable in response to a key 284. In the exemplary embodiment illustrated in FIG. 15 it is contemplated that fasteners 280 are covered by a rearwardly extending portion of upper fascia similar to portion 98 shown in FIG. 6. Thus, fasteners 280 are not accessible from outside the machine until first locking mechanism 282 has been operated to release upper fascia 276 so that the upper fascia 276 can be moved away from top housing cover 212.

In the exemplary embodiment, machine 210 may include a lower fascia 288 with features similar to a lower fascia previously described. Lower fascia 288 may be secured in the covering position by a second locking mechanism 290.

This exemplary embodiment provides ready access to the upper banking machine components, for example, for servicing or replacing. To access the upper banking machine components, fasteners 280 are removed. It is contemplated that in an exemplary embodiment, the fasteners may not be accessible until after the first locking mechanism 282 is unlocked and the upper fascia is displaced slightly to uncover fasteners 280. In other embodiments, the fasteners may be directly accessed.

The top housing cover 212 may then be moved rearwardly, away from upper fascia 276 so that the interior area is accessible. During servicing, the top housing cover 212 may be selectively positioned so that some portion or none of the upwardly extending flanges 254, 256 remain engaged with the channel members 260, 268, respectively.

In one exemplary embodiment, a method is provided for accessing banking machine components of a machine. The exemplary method includes supporting the top housing cover in a slidable relationship with the top wall of the chest housing, wherein the top housing cover includes a front opening; selectively rearwardly sliding the top housing cover away from a first position in which an upper fascia covers the front opening; and accessing at least one upper banking machine component that is mounted in supporting connection with the top wall of the chest housing.

The exemplary method further includes removing fasteners that may be used to selectively secure the top housing cover in the first position.

The exemplary method further includes operating a locking mechanism to release the top housing cover and the upper fascia.

The exemplary method further includes accessing an upper banking machine component for servicing. The at least one upper banking machine component may be a display that is accessed for servicing.

In one embodiment the machine includes side flange members mounted in supporting connection with a top wall of a chest housing and cooperative channel members mounted in supporting connection with the top housing cover. In this exemplary embodiment, the method further includes slideably engaging a first flange member with a first channel of a first channel member.

Figure 16:
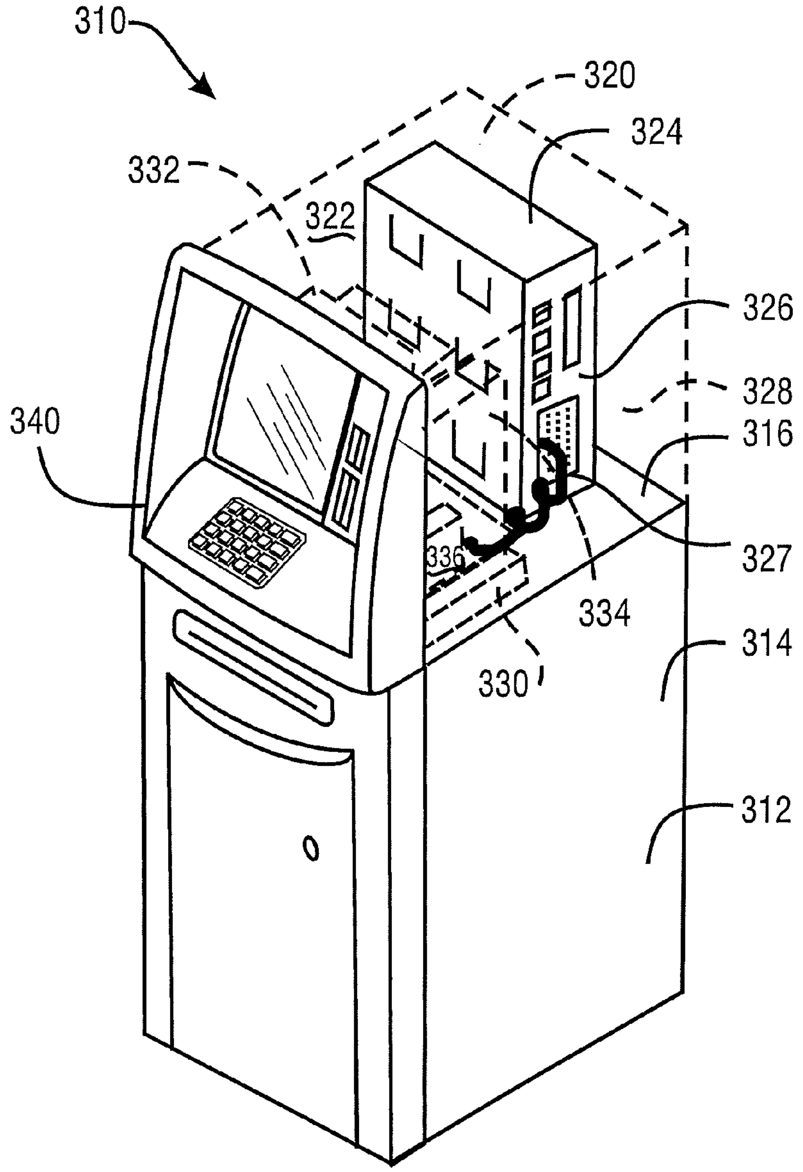
FIG. 16 is an isometric view, partly in phantom, of an alternate exemplary embodiment of an automated banking machine in an operational condition.
Figure 17:
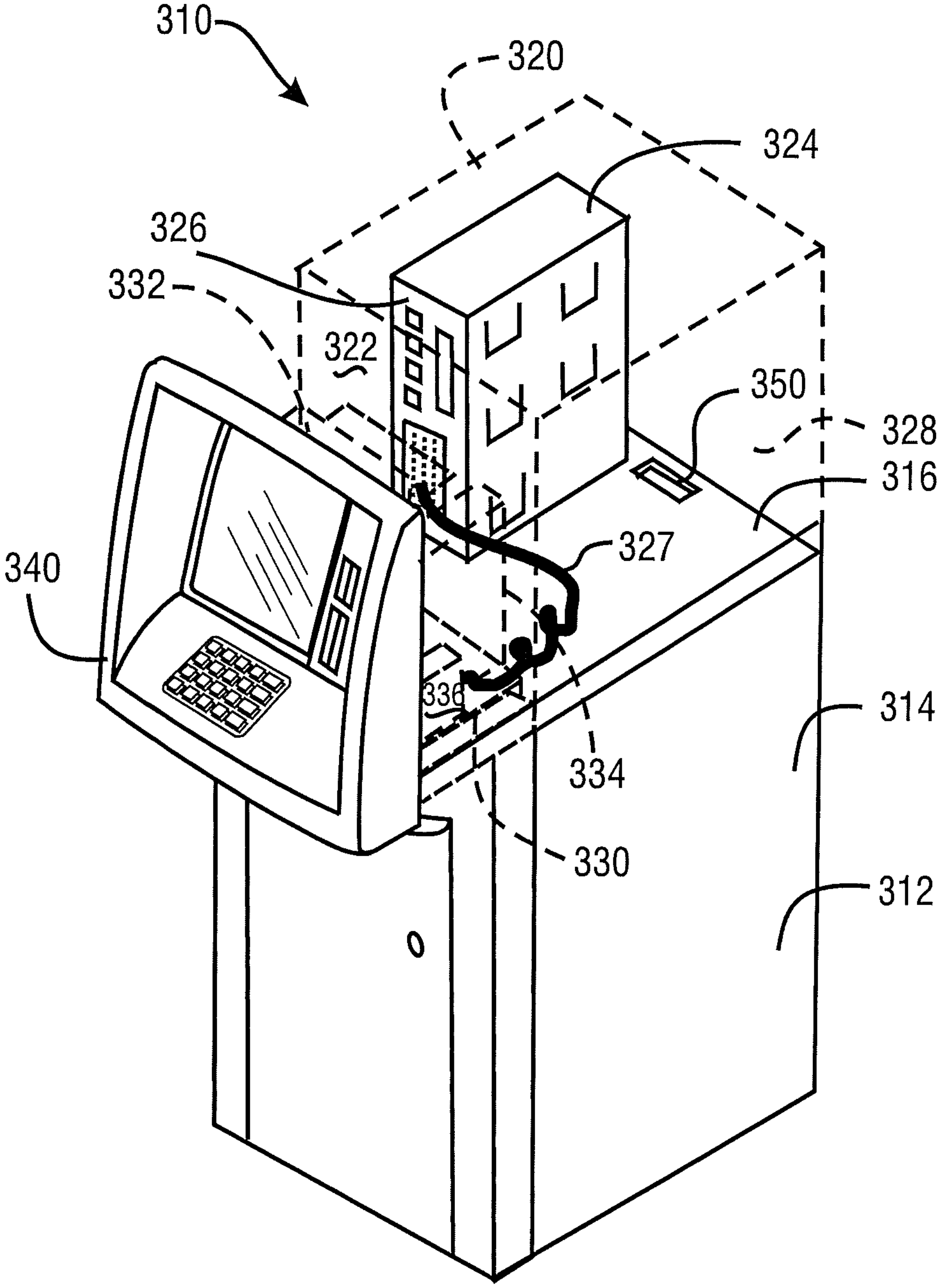
FIG. 17 is an isometric view, partly in phantom, of the automated banking machine of FIG. 16, in a serviceable condition.

In another exemplary embodiment, illustrated in FIGS. 16 and 17, machine 310 may include a chest 312 having a chest housing 314 including top wall 316. As in previously described embodiments, chest housing 314 bounds a secure area which holds lower banking machine components including a currency dispenser mechanism which may be similar to mechanism 64 shown in FIG. 3. Machine 310 further includes a top housing 320 (shown in phantom) bounding an interior area 322.

In this exemplary embodiment, machine 310 includes a processor case 324 that houses the primary machine processor. The processor may be an Intel Pentium, Celeron or other type processor. Of course, in some embodiments the case may house multiple processor or no processors at all. The machine processor causes operation of the various devices and mechanisms in the machine.

In this exemplary embodiment, processor case 324 is in supporting connection with top wall 316 of chest housing 314. Processor case 324 includes a first functional side 326 that is operable to establish connections, such as through cable 327, from the various banking machine components. Other processor components, including but not limited to circuit cards having various functions, additional processors, drives (CD, DVD, floppy), power supplies, memory, or encryption cards, may be carried on or within processor case 324. Such components may also be accessed, removed and/or replaced and routine maintenance performed through access to the functional side of the processor case.

In order to minimize the space occupied by machine 310, it is advantageous to orient processor case 324 of the exemplary embodiment so that the first functional side 326 is substantially parallel to a first side wall 328 (shown in phantom) of top housing 320. However, in order to easily access first functional side 326 for servicing or connecting cables, it is advantageous to orient processor case 324 so that the first functional side 326 is substantially perpendicular to the first side wall 328, facing the front opening of the machine. In order to accomplish both these purposes, the processor case 324 of the exemplary embodiment is rotationally supported in connection with the top wall 316 of the chest housing. The processor case 324 is selectively rotationally movable between an operational position, shown in FIG. 17, wherein the first functional side 326 is substantially parallel to the first side wall 328, and a service position, shown in FIG. 16, wherein the first functional side 326 is substantially perpendicular to the first side wall 328.

In this exemplary embodiment, a rollout tray 330 is supported on the top wall 316 of the chest housing 314. As in earlier described exemplary embodiments, the rollout tray 330 is selectively movable between a retracted position wherein the rollout tray 330 is within the interior area 322, and an extended position wherein the rollout tray 330 extends outwardly from the interior area through a front opening in the top housing 320. In the exemplary embodiment, various upper banking machine components such as display 332, receipt printer 334, and card reader 336 are supported on rollout tray 330. Also, an upper fascia 340 may be mounted in supporting connection with rollout tray 330. As in other described embodiments, when the rollout tray is in the retracted position, the upper fascia 340 covers the front opening in the top housing.

In the exemplary embodiment, when rollout tray 330 is in the retracted position, as illustrated in FIG. 16, the processor case 324 is prevented from rotating from the operational position to the service position. When the rollout tray 330 is in the extended position, as illustrated in FIG. 17, there is enough clearance in the interior area 322 to permit the processor case 324 to be rotated into the service position. Thus, when the rollout tray 330 is in the extended position, the upper banking machine components supported thereon are readily accessible for service. Likewise, the cable connections and any processor components carried on the processor case are accessible for service.

In a method for servicing banking machine components of a machine, a rollout tray 80 mounted in supporting connection with a top housing 320 is extended from a retracted position so that the rollout tray extends through a front opening in the top housing. The method includes disengaging any locking mechanisms that operate to retain the rollout tray in the retracted position.

A processor case 324 disposed in an interior area bounded by the top housing may be rotated from an operational position to a service position. At least one processor component mounted in supporting connection with the processor case may be accessed for servicing. After servicing of the processor component is complete, the processor case may be rotationally returned to the operational position from the service position. Thereafter, the rollout tray may be repositioned into the retracted position.

The step of servicing the processor component may include connecting or disconnecting cables or connections, adding or replacing components such as circuit cards, performing diagnostic tests and other functions to facilitate operation of the machine.

Prior to repositioning the rollout tray, other banking machine components may be serviced while the rollout tray is extended. For example, a display, card reader, and receipt printer assembly are readily accessible for service. The service can include routine maintenance, replacement of non-working components, addition of other banking machine components, and the like. Connections with the processor can be readily made while the rollout tray is in the extended position and the processor case is in the service position.

The machine may include a slidable top housing cover as earlier described. The service method includes the step of rearwardly sliding the top housing cover. After the servicing of banking machine components is completed, the method includes returning the top housing cover to an operational position.

During servicing of the machine, the lower banking machine components may also be accessed for servicing. The service method includes disengaging any locking mechanisms that retain the lower fascia in a covering position. The lower fascia may thereafter be moved into the accessible position. The locking bolt mechanism that securely engages the chest door with the chest housing may be disengaged so that the chest door may be placed in the open position.

An exemplary method further includes the step of engaging the chest door with the lower fascia when the chest door is in the open position and the lower fascia is in the accessible position in order to retain the door in the open position.

The lower banking machine may include components or modules, such as currency stacker, currency dispenser mechanism, and currency delivery mechanism (as shown in FIG. 3). An exemplary service method includes performing routine maintenance, replenishing currency, removing sheets, disengaging sheets from the currency dispenser mechanism, replacing components and the like.

The machine can include connections and/or cables that extend between the processor case and lower banking machine components that are generally housed within the secure chest. The chest housing may include various openings 350 through the walls to accommodate the connections and/or cables (FIGS. 10-11 and 17). When the processor case is in the service position, the connections can be readily established, maintained and/or changed.

An exemplary method of constructing a machine is described. The exemplary method includes mounting a top housing in supporting connection with a chest adapted for use in an automated banking machine apparatus. A first chest door is operable to selectively close a first opening in the chest housing.

The method further includes mounting an upper fascia in supporting connection with the top housing and mounting a lower fascia in movable supporting connection with the chest housing.

The upper fascia and the top housing are selectively positioned relative each other so that a front opening in the top housing is selectively covered by the upper fascia, and wherein a rearwardly extending portion of the upper fascia overlies a forward region of the top housing.

The lower fascia is selectively positioned in a covering position relative a chest door wherein a first side extension of the lower fascia overlies a first forward portion of the chest housing and wherein a second side extension of the lower fascia overlies a second forward portion of the chest housing.

In an exemplary method, a lower edge surface of the upper fascia is placed in substantially parallel alignment with an upper edge surface of the lower fascia and an end edge of a rearwardly extending portion of the upper fascia is substantially vertically aligned with an end edge of a first side extension of the lower fascia at a first side of the machine.

In an exemplary method, a second chest door is moveably mounted in supporting connection with the chest housing to operably close a second opening in the chest housing. A first locking bolt mechanism may be mounted to the first chest door and an alternate securing mechanism may be mounted to the second chest door.

In an exemplary method, a processor case is mounted in supporting rotational connection with a top wall of the chest housing wherein the processor case is selectively movable between an operational position and a service position, and wherein the processor case houses at least one processor.

In an exemplary method, the lower fascia is equipped with an inwardly extending flange operate to selectively engage the chest door when the lower fascia is in the accessible position and the chest door is in the open position.

Figure 18:
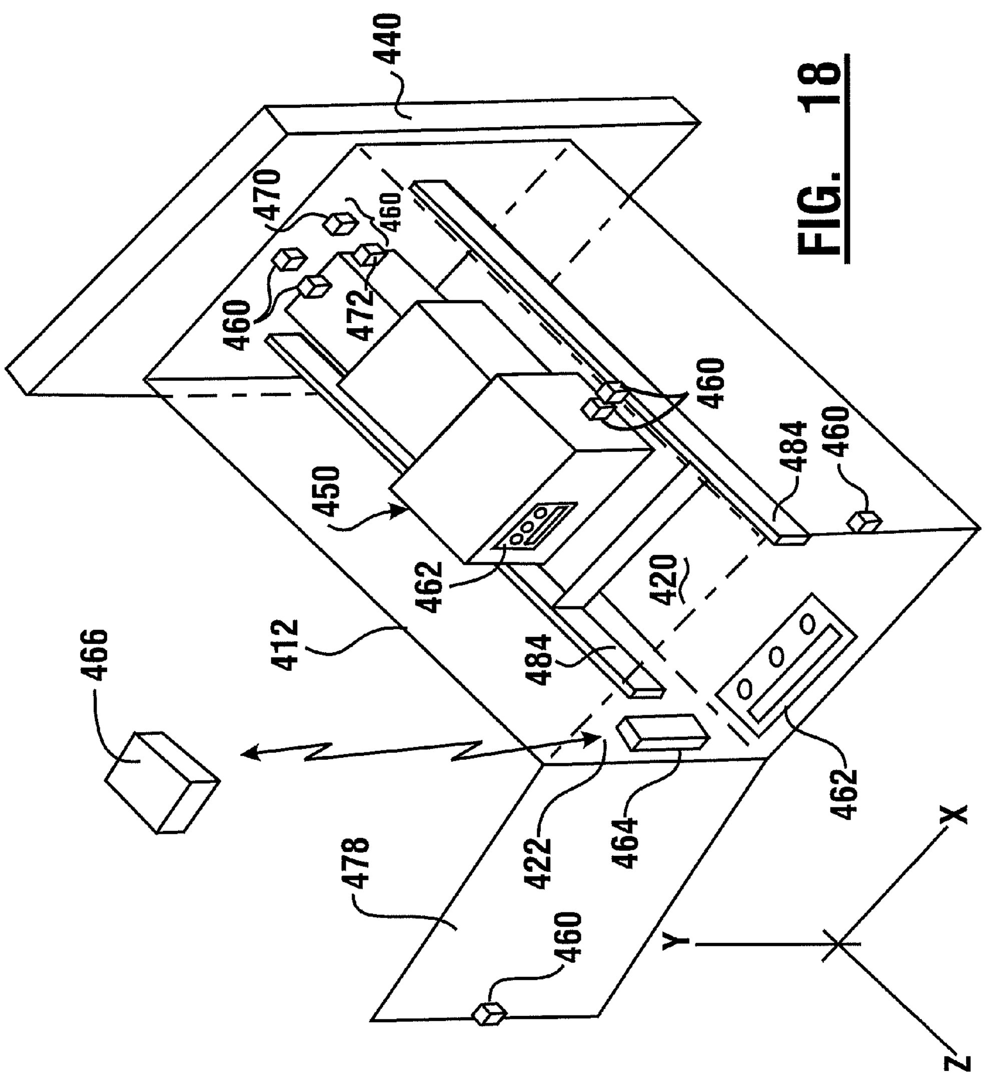
FIG. 18 is a side schematic view of an automated banking machine illustrating various exemplary banking machine components, and components indicating the positions of one or more modules of the machine.

FIG. 1 illustrates generally an exemplary automated banking machine which is an automated teller machine 10. FIG. 18 is an illustration of a portion of an automated banking machine showing an exemplary embodiment. A housing 412 bounds an interior area 420 and includes an opening 422 to the interior area 420. A door 478, capable of at least partially covering the opening 422, is moveably mounted, generally on hinges, but other attachment methods may be used, or the door 478 may be removable from the housing 412. Included in operatively supported connection with the housing 412 are at least one module, shown generally as module 450. As will be seen generally in FIG. 3, such modules in an exemplary embodiment may include a card reader 24, a display 28, and a cash dispenser 64, each in operatively supported connection with the housing 412. The card reader 24 is operative to read indicia on user cards corresponding to financial accounts. Other embodiments may include a check acceptor or a bill recycler, for example.

The module 450 is moveably mounted in operatively supported connection with the housing 412, shown in exemplary fashion on slides 484 in FIG. 18. The module 450 is moveable between an operative position in which it is positioned in an operative position within the housing 412, and a service position. In the service position, the module 450 extends in and at least partially through the opening 422 to allow access to more areas of the module for servicing by a servicer. In the operative position, it may be necessary to align the module 450 with various openings in the front of the machine 10 (best seen in FIG. 2), connectors, transports or other structures. Such alignment may be beneficial to the reliable and efficient operation of the machine. If the module 450 is not correctly aligned and positioned within the housing 412, resultant misalignment and gaps may cause malfunctions and/or compromise the security of the machine 10 as well as contribute to malfunctions and customer inconvenience. Alignment of the module with the fascia 440 may also be desirable for similar or different reasons.

Referring to FIG. 18, exemplary alignment parameters for an exemplary module include vertical (up-down, "Y" in Cartesian coordinate space), lateral horizontal (left-right, "X" in Cartesian coordinate space), and in-out (forward-backward, "Z" in Cartesian coordinate space). At least one first position sensor 460 is operative to sense a position of a first portion of the module 450. At least one indicator 462, is operative to indicate the status of the sensor 460 and provides at least one visual output indicative that the first portion of the module 450 is in a position that corresponds to the operative position of the module. Likewise, in exemplary fashion, second and third position sensors 460 may also be included to sense other portions of the module 450 disposed from the first portion as well as from one another. In the exemplary embodiment each position sensor is in operative connection with a respective visual indicator. The status of the additional sensors 460 may further be indicated by one or more outputs from indicators 462. Alternatively in other embodiments plural sensors may be in operative connection with one or more common indicators that provide outputs indicative of respective portions of a module.

In operation, the sensors 460 communicate with circuitry which causes the indicators 462, to visually show when each of the portions of module 450 is properly positioned. In an exemplary embodiment, the sensors 460, in cooperation with the indicators 462, are used to guide the servicer in moving and positioning the module after servicing and/or in adjusting the alignment of the module 450, for proper operation. For example, lights, which may be, for example, LEDs (light emitting diodes), may indicate red when a particular alignment parameter for a module portion is sensed by the corresponding sensor as out-of-limit or out of proper position and green when the respective sensor portion of the module 450 is properly positioned relative to the housing 412 and the fascia 440 to permit proper operation. Of course such indicators are exemplary and in other embodiments, other types of visual and/or audible output devices may be used.

In a further exemplary embodiment, the door 478 may also be in operative connection with at least one position sensor 460 to sense, and in cooperation with the indicator 462, indicate, that the door 478 is properly aligned and closed over the housing opening 422. In some embodiments the door or other housing portion may include a window or similar structure to enable viewing one or more indicators within the machine, from the outside of the housing. In other embodiments indicators may be mounted on the housing so as to be visible on the outside of the housing. These approaches are exemplary and in other embodiments other approaches may be used.

The sensors 460 may be of various types, for example a reed switch, vane sensor, Hall effect sensor, magneto-resistive sensor, variable reluctance sensor, inductive sensor, infrared sensor or opto-electronic sensor may be used. Vane sensors may be adjustable by suitable firmware or circuitry that controls the output devices to compensate for decreased output and can provide reasonably tight tolerances. In a further exemplary embodiment, sensors 460 may include first 470 and second 472 elements such an emitter and a receiver of signals, respectively. Such signals may be radiation either in the visible or not visible range, sonic signals or signals of other types. Each sensor 460 within a single housing 412 for sensing different module portions need not be of the same type. As can be appreciated, sensors of a particular type may be especially suitable for a particular application. The sensors 460 may communicate with the circuitry that causes outputs from indicators 462 wirelessly or by being hard wired. Additionally, one or more indicators 462 may be included in a single unit to show conditions of multiple sensors or each indicator 462 may show the status of only one movable portion and one sensor 460. The indicators may be operatively supported on the module as shown, or in other embodiments may be located elsewhere in and/or supported by the housing of the machine. Of course these approaches are exemplary.

In a further exemplary embodiment, a sensor 460, either directly or through the indicator 462, communicates with at least one local processor 464 in the machine. In some embodiments each module 450 may have its own local processor 464, or a machine 10 could have one or more local processors 464. Further, the local processor 464 may cause the machine to communicate with a remote processor 466. The remote processor may be included in a remote computer at a location disposed from the machine. Thus, for example, module position, module alignment and door status may be communicated to a remote location to trigger appropriate actions, such as alarms or a request for servicing.

While an exemplary module 450 is shown, numerous types of modules which include serviceable components may be made to provide an indication that the module is not in proper operative position or that the module requires alignment, using associated sensors 460 and indicators. Exemplary modules may include a card reader 24, a display 28, a cash dispenser 64, a printer 30 (FIG. 3), a bill acceptor, a bill recycler and a check acceptor.

In an exemplary method, the housing door 478 is unlocked. From a closed position the door is moved to an open position and the module 450 extended at least partially from the housing interior area 420 through the housing opening 422 to a position suitable for servicing by a servicer. A service activity is conducted on the module 450 while it is extended in the opening 422. Such service activity may include, but is not limited to, replenishing cash, replacing journal printer paper, replacing receipt paper, and/or replenishing other consumables on the module, removing and replacing at least a portion of the module 450, replacing parts, adjusting portions of the module 450, and other types of service activities. Following servicing, the module 450 is moved by a servicer toward its operative position within the housing 412. While moving the module 450 toward its operative position, it is determined by the circuitry in operative connection with the plurality of sensors whether each respective portion of the module 450 is, or is not, sensed by each sensor as in a position corresponding to the operative position. In an exemplary embodiment the output devices provide one or more visual outputs indicative of the position of a plurality of disposed areas on the module. The servicer may observe the condition of the module in the areas of sensors 460 as indicated by the indicator and/or indicators 462 as the servicer moves the module toward the operative position. In an exemplary embodiment a visual indication as to whether each sensor senses the associated portion of the module in a respective position that corresponds to an operative position of the module is provided. In the exemplary embodiment the indicators comprise a respective indicator corresponding to each sensor, which indicates via a change in color output whether a corresponding portion of the module has reached its corresponding operative position. In exemplary embodiments a processor in operative connection with the sensors is operative to provide outputs through a readout display panel to assist a servicer in positioning the module in accordance with programmed instructions. When the servicer has moved the module to the operative position as indicated by all the indicators, the servicer may cease efforts to move the module. If the module is not sensed as fully in the operative position, adjustments to the position of the module 450 are made to position the module 450 so as to place the module in the operative position. This may be done responsive to the color indicators and/or indicia corresponding to instructions output through the readout display panel which indicate to the servicer how to move the module or portion thereof (or move adjusting screws or other members) to place the module in the operative position. In a further exemplary embodiment, the status of the position of the module 450 is sent through operation of the local processor in the banking machine to a remote computer 466. Of course this approach is exemplary.

In a further exemplary embodiment, a method is provided including sensing a position of a module 450 relative to a housing 412 of an automated banking machine 10 (FIG. 3). The automated banking machine 10 includes a card reader 24 (FIG. 3) operative to read cards including data corresponding to financial records, a display 28 (FIG. 3), and a cash dispenser 64 (FIG. 3). The automated banking machine includes circuitry that is operative to communicate the position of the module 450 or one or more portions thereof relative to the housing 412, to a remote computer 466. See, generally, FIG. 18. Thus, misalignment of sensed portions, components or areas on a module 450 in the automated banking machine 10 may be made known at a location remote from the automated banking machine 10. Such misalignment, for example, may be the result of damage to the automated banking machine 10 by accident, servicer error or by malicious tampering. Appropriate action may then be taken.

Figure 19:
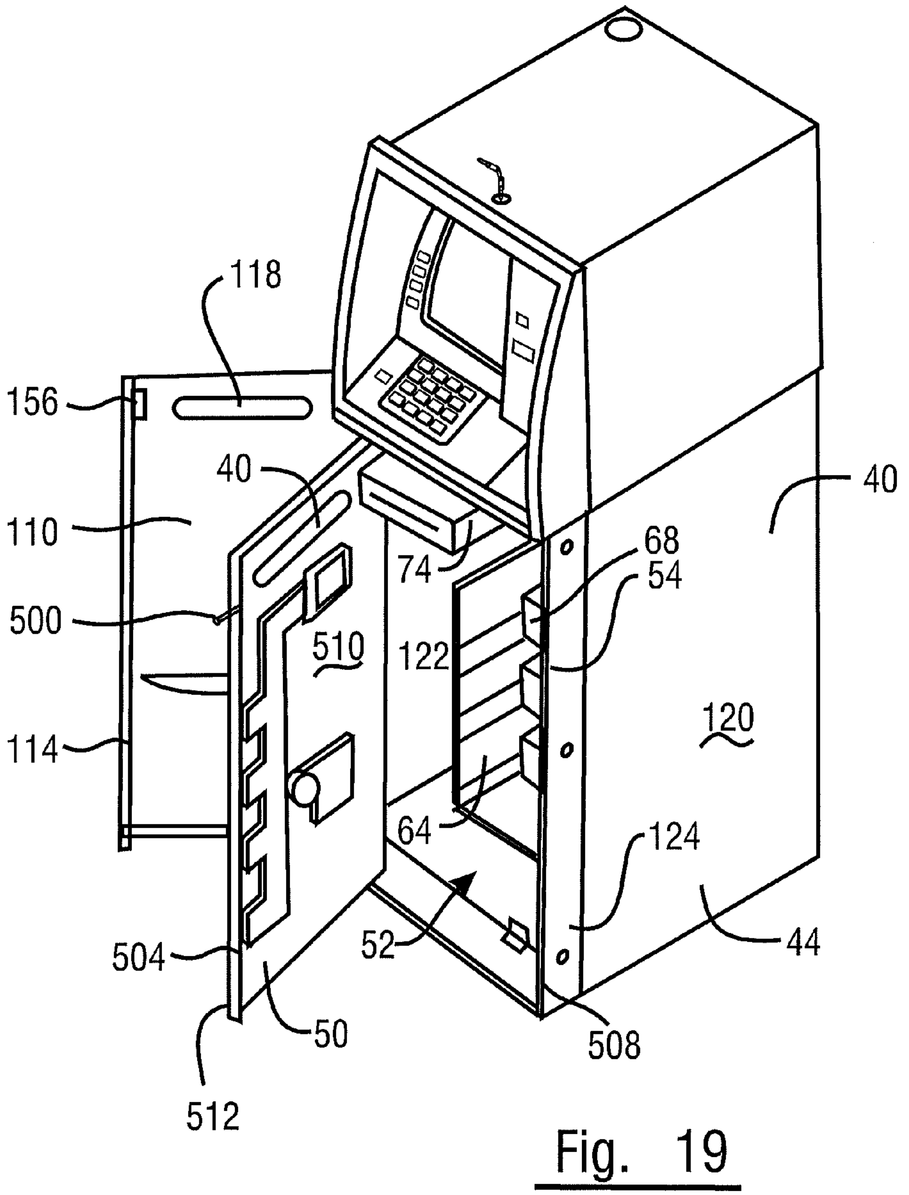
FIG. 19 is an isometric view of another exemplary embodiment of an automated banking machine with a lower fascia in an accessible position and a chest door in an open position.
Figure 20:
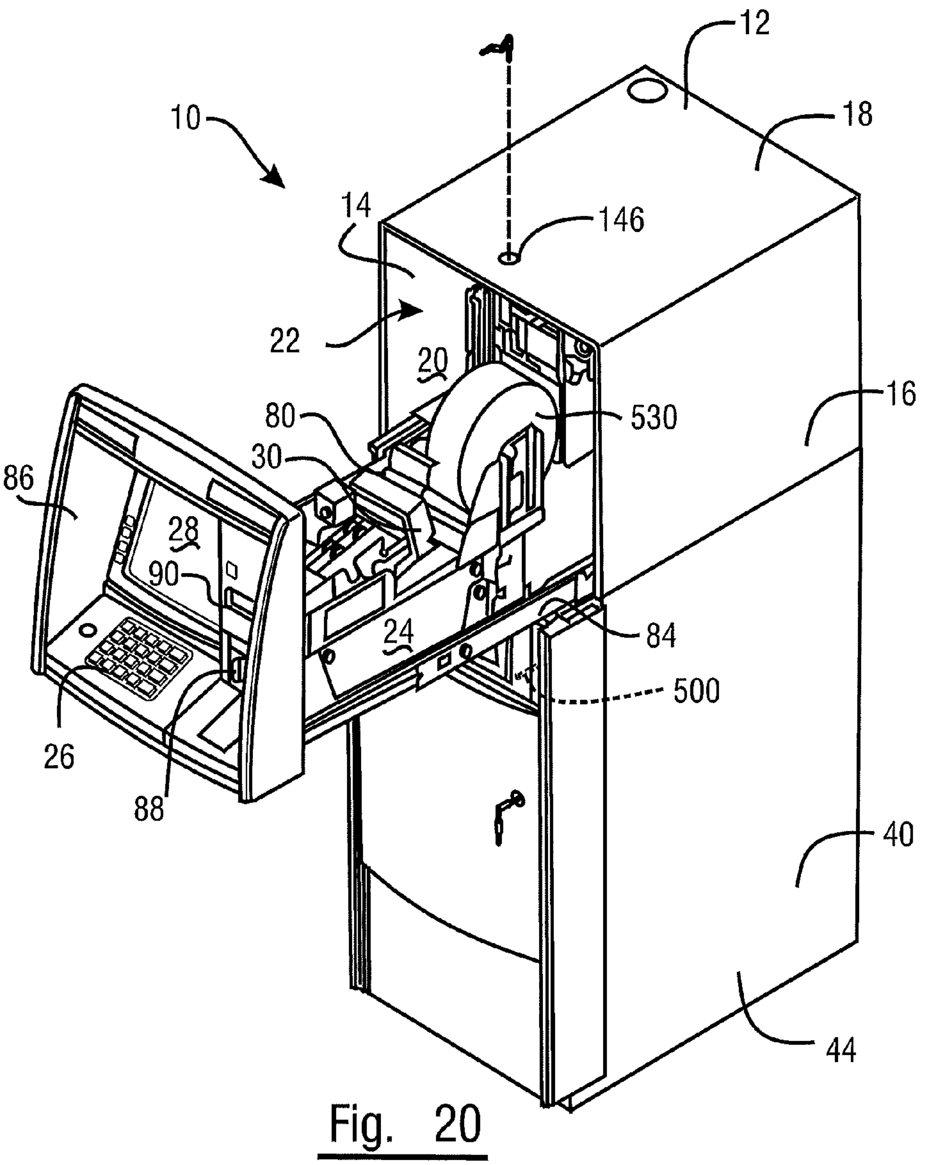
FIG. 20 is an isometric view of the automated banking machine of FIG. 19 with the doors closed and a rollout tray extended.
Figure 21:
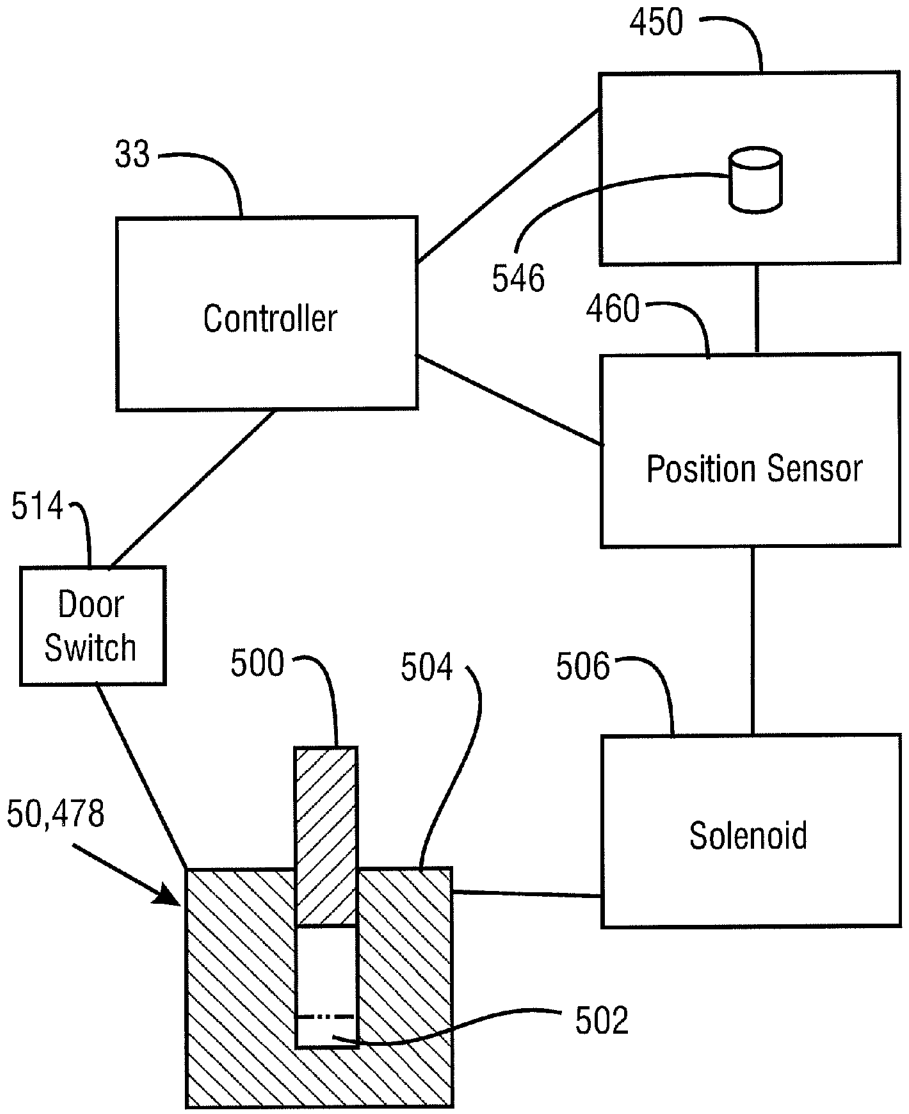
FIG. 21 is a schematic and partial sectional view of a system for preventing a door of a chest or module from closing based on the position of a module in the automatic banking machine of FIG. 19.

The at least one position sensor may be operatively connected to other indicating devices. One such exemplary embodiment is shown in FIGS. 19-21. In this embodiment, the indicating device includes a mechanical type device that includes at least one moveable member. The moveable member prevents the chest door 50 in an open position from moving to a closed position. In particular, the indicating device includes a stop such as a finger or bolt 500 that is slidably mounted in an opening 502 (FIG. 21) of the chest door 50 formed in the side 504 of the chest door 50 facing the door jamb (when the chest door 50 is closed). The bolt 500 moves along the opening 502 relative to the chest housing 44 between a retracted position (as seen by the phantom lines of FIG. 21) and an extended position (as seen in FIGS. 19 and 21) through operation of an actuator or drive such as a solenoid 506. Alternatively, other suitable actuators such as a motor, cylinder, or rotary actuator may instead be provided to move the stop between the retracted and extended positions. When the stop 500 is in the extended position, the stop 500 extends beyond the side 504 and over the forward portion 124 of the first side wall 120 of the chest housing 44 (when the chest door 50 is located forwardly or outwardly adjacent the forward portion 124). Thus, in the extended position, the stop 500 will engage the front side 508 of the forward portion 124 when the chest door 50 is moved from the open position toward the closed position. In this respect, the exemplary stop 500 acts to prevent the door 50 from closing according to certain conditions.

Alternatively, the stop 500 may be movably mounted to either the inner side 510 or the outer side 512 of the chest door 50 instead of within the opening 502. In another alternative arrangement, the stop 500 may be movably mounted to the forward portion 124 instead of the chest door 50. In this alternative arrangement, the stop may be moved to an extended position in which the stop extends over the rear or inner side 510 of the door 50 (when the door 50 is located forwardly or outwardly adjacent the forward portion 124). Thus, in the extended position, the stop 500 will engage the inner side 510 of the door 50, when the door 50 is moved from the open position toward the closed position. Alternatively or in addition, the stop 500 may be moveably mounted to the door 478 of the housing 412 for the module 450. In this alternative arrangement, the stop may be moved to an extended blocking position in which the stop extends over the right side of the housing 412 (when the door 478 is located forwardly or outwardly adjacent the right side of the housing 412). Thus, in the extended position, the stop 500 will engage the inner side of the door 478, when the door 478 is moved from the open position toward the closed position.

The at least one position sensor 460 is operatively connected to a computer such as controller 33 of the machine 10 or other computer processor, which in turn is operatively connected to the solenoid 506. The controller 33 may be hard wired through an appropriate interface to the solenoid 506 or wirelessly connected to the solenoid 506. In operation, when the chest door 50 is open and it is determined by the controller 33 that the module 450 is in a position other than the operative position, the solenoid 506, responsive to the controller 33, moves the stop 500 to the extended position. Alternatively, the controller 33 may not be operatively connected between the position sensor and solenoid 506, and instead the position sensor 460 may be operatively connected to the solenoid via a hardwired or wireless connection. In this alternative arrangement, the solenoid 506 is responsive to the position sensor 460 to cause the stop 500 to move to the extended blocking position when the position sensor 460 either detects that the module 450 is not in the operative position or fails to detect that the module 450 is in the operative position.

When a service person or other operator for the machine 10 moves the door 50 toward the closed position, the stop 500 engages the forward portion 124 and thus the door 50 is prevented from moving to the closed position. This engagement between the stop 500 and forward portion 124 alerts or indicates to the service person that the module 450 is not in the operative position. When the service person then moves the module 450 to the operative position, the solenoid 506, responsive to the controller 33 and position sensor 460, moves the stop 500 to the retracted position to allow the chest door 50 to move to the closed position. The chest door 50 may then be moved to the closed position and locked by the service person by changing the lock to a locked condition.

In alternative example embodiments, the at least one moveable member which provides an indication that the serviceable component is not in the operative position may have other forms. For example, in some embodiments a chest door or other door to a machine enclosure may include a bolt which is in operative connection with a lock such as those previously described. When the serviceable component is moved out of the operative position for servicing, the lock must first be changed from a locked to an unlocked condition, and the bolt must be moved from a secured to an unsecured position so that the door can be opened. When service activities are performed on the serviceable component and such activities are completed, the serviceable component may be returned toward the operative position. However, if the serviceable component is not placed in the operative position but instead is somewhat displaced therefrom, the at least one sensor will be operative to sense the serviceable component in a position other than the operative position. In response to sensing the serviceable component in other than the operative position, the stop may be positioned by an actuator to engage and hold the bolt in the unsecured position. Thus while the servicer may be able to move the chest door to a closed position, the bolt cannot be moved from the unsecured to the secured position. Thus the chest door cannot be locked. This alerts the servicer that they did not put the component back in the operative position. The servicer can then open the door and move the component so it is in the operative position. In the example embodiment, this will cause the stop to be moved by the actuator so that the door can then be closed and the bolt moved from the unsecured to the secured position. The associated lock can then be changed from the unlocked to the locked condition so as to secure the door in a door locked condition. Of course it should be understood that stops of various configurations may be used in connection with other aspects of a door securing or locking mechanism in other embodiments.

A further alternative is that at least one moveable member that moves responsive to the position of the serviceable component, may be included in or associated with a lock that controls the condition of a chest door or other door which controls access to an interior area. In such embodiments the at least one moveable member may move through operation of a drive or other actuator to prevent the lock from being changed to a locked condition. Thus for example, in order to perform service activities the lock must be first changed from a locked to an unlocked condition, a bolt or other securing mechanism moved from a secured to an unsecured position, and the door opened. The at least one serviceable component may then be extended through the opening, and service activity performed thereon. Upon completion of the service activity, the serviceable component is again moved back fully into the interior area of the chest toward the operative position. However, if the serviceable component is not sensed by the at least one position sensor as being returned to the operative position, the at least one moveable member may be moved so as to prevent the lock from being changed from the locked condition to the unlocked condition. Thus when the service person attempts to place the machine back into service by closing the door and locking the lock, the servicer will be alerted to the problem by the inability to lock the lock.

In some example embodiments, serviceable components may include the capabilities to have a set of diagnostic tests performed thereon. The set of diagnostic tests may include in exemplary embodiments a plurality of diagnostic tests that are performed on or through operation of the serviceable component to determine if the serviceable component is in an operative condition. These diagnostic tests may in some embodiments be performed responsive to at least one processor causing the exercise of actuators on the serviceable component to test to be sure that the various components thereof perform as expected. For example in some embodiments, at least one controller 33 in the automated banking machine may send messages to the at least one serviceable component to cause the set of diagnostic tests to be performed. In some example configurations, when the module which comprises the serviceable component is moved from the operative position for service activities, the stop may be positioned to prevent the chest door or other component from being moved to the closed position. The controller 33 may cause the set of diagnostic tests to be performed on the module 450 responsive at least in part to the service person having moved the module 450 from a servicing position to the operative position. After all of the diagnostic tests are complete, the controller 33 may then cause the solenoid 506 to move the stop 500 to the retracted position to allow the door 50 to move to the closed position.

Alternatively or additionally, one or more door switches 514 or other sensors (FIG. 21) may be operatively connected the chest door 50 to detect the whether the chest door 50 is in the closed position. The switches 514 may also be operatively connected to the controller 33. In particular, the output signals of the switches 514 may be provided through an appropriate interface as inputs to the controller 33. In response to the output of the switches 514, the controller 33 may operate in accordance with its programming to determine whether the chest door 50 is in at least one of the open position or closed position. If the controller 33 determines that the chest door 50 is in the closed position and the module 450 moves out of the operative position due to a malfunction, for example, the controller 33 will not cause the solenoid to move the stop to the extended position. Alternatively, the exemplary arrangement may be configured such that deployment of the stop 500 to the extended position will not cause a problem when the door is closed.

Also, if the controller 33 determines that the chest door 50 is in the closed position and the module 450 moves out of the operative position, the controller 33 may cause the machine 10 to send one or more messages to a remote maintenance server or processor of remote output device to notify a person of this condition. A system that sends and receives status messages related to a machine is disclosed in U.S. Pat. No. 7,641,107, the disclosure of which is incorporated by reference in its entirety. Further, an override feature may be included to allow the service person to cause the solenoid 506 to move the stop 500 back to the retracted position even if the module 450 is not in the operative position. For example, the service person may depress a pushbutton or enter inputs via the keypad to cause the solenoid 506 to move the stop 500 to the retracted position.

Alternatively, the at least one position sensor 460 may be operatively connected to a particular serviceable component on a module and be operative to sense whether that component is in its operative position and/or locked in its operative position. For example, the at least one position sensor 460 may be operatively connected to transports of a check acceptor that can be opened for service and then locked closed. These transports include a plurality of belts that operate to engage and move items such as checks or other financial documents deposited thereon. One example of such a check acceptor may be that disclosed in U.S. Pat. No. 7,213,746, the disclosure of which is incorporated by reference in its entirety. The transports may be unlocked from the operative position and moved to a service position for servicing, and then moved back to then operative and locked. The at least one position sensor 460 may detect the position of the transport. In response to the position sensor, the controller 33 may determine whether one or more of these transports is or is not in the operative position and/or locked in the operative position. When the chest door 50 is opened, and it is determined by the controller 33 in operative connection with the position sensor 460 that the transport is not in the operative position and/or locked in the operative position, the solenoid 506, responsive to the controller 33, causes the stop 500 to move to the extended position.

One or more position sensors may be operatively connected to other serviceable components or modules of the exemplary automated banking machine. For example, one or more position sensors may be operatively connected to one or more document holding cassettes or canisters 68 located in the chest 40. The canisters 68 may alternatively be referred to as the module. As previously mentioned, the canisters contain stacks of currency sheets 66. The canister may also contain checks or other financial documents. The canisters may be associated with serviceable components such as a cash dispenser, a cash acceptor, a cash recycler, a check acceptor, or other sheet handling module utilized in the operation of the automated banking machine. Each canister may be in an operative position as shown in FIGS. 3 and 19. To service the canister 68, the chest door 50 is opened to gain access to the canister 68. The canister 68 is then moved out of the operative position to a service position for servicing. The servicing may include removing or placing currency sheets or other sheets in the canister 68. The servicing may include replacing the canister 68 with another canister. The at least one position sensor 460 may detect the position of the canister 68. In response to the position sensor 460, the controller 33 may determine whether one or more of these canisters 68 is or is not in the operative position. When the chest door 50 is opened, and it is determined by the controller 33 that the at least one canister 68 is not in the operative position, the solenoid 506, responsive to the controller 33, moves the stop 500 to the extended position. When the serviceperson for the machine 10 moves the chest door 50 toward the closed position, the exemplary stop 500 engages the forward portion 124 and thus the chest door 50 is prevented from moving to the closed position. This engagement between the stop 500 and forward portion 124 alerts or indicates to the operator that a canister 68 is not in the operative position. Alternatively or in addition, the canister 68 may also be provided with another indicator that indicates to the serviceperson when the canister 68 is in the proper position. The indicator may be, for example, of the type disclosed in U.S. patent application Ser. No. 12/459,189, the entire disclosure of which is incorporated by reference in its entirety. Of course in other embodiments other types of indicating devices or mechanisms may also provide an indication that a canister or other serviceable component of the automated banking machine is not in the operative position.

In some exemplary embodiments one or more serviceable components or circuitry associated therewith may include data that indicates the presence of a fault condition. This might occur for example in situations where the module includes at least one processor and data store thereon, and the processor and data store record data representative of fault conditions in the at least one data store to facilitate the identification and repair of conditions. In some exemplary embodiments, modules may include numerous different items of data indicative of faults which exist with the modules. Service persons who are responsible for servicing the modules will generally be able to recover such data, either through operation of the machine or through separate diagnostic devices, to determine conditions which may exist with the module so as to facilitate the repair thereof. The data corresponding to the fault conditions may also be removed from the at least one data store in response to the service activities that are performed by the service provider. Thus in the exemplary embodiment the serviceable component will ideally not have any data corresponding to fault conditions stored in its associated data store after servicing when the module is returned to the operative position.

However in some exemplary embodiments, if data corresponding to a fault condition is present in the data store of the serviceable component when it is returned to the operative position, the at least one controller may operate to identify this condition. This might occur for example if the controller operates to instruct the module to perform the set of diagnostic tests that are carried out when the module is returned to the operative position. If data corresponding to a fault condition is present in the data store, the controller may operate to cause the stop to be moved or to continue to be in the position where the chest door is prevented from being moved to the closed position. In this way the servicer is alerted that data representative of a fault condition is still present in the at least one data store, and further service activity is needed. Further, in some exemplary embodiments, the controller may also operate in response to determining that data corresponding to a fault condition is present to not cause the series of diagnostic tests to be performed. This will avoid unnecessary time to be consumed in attempting to have the entire set of diagnostic tests performed on the module when it is known that a service issue corresponding to a fault condition still exists. Of course these approaches are exemplary, and in other embodiments other approaches may be used.

Service persons such as cash-in-transit persons may replenish rolls of printing paper in the printer 30 used during operation of the machine, for example, to print receipts. An example of a printer of a machine that prints receipts is shown in U.S. Pat. No. 6,547,464; the disclosure of which is incorporated by reference in its entirety. The printing paper may be top of form (TOF) paper. The top of form paper has a black top of form mark on one side of the paper near the top of the form used for printing receipts or other media types. The top of form mark provides an indication on the paper roll as to where to cut the paper to provide a printed receipt form from the machine. The top of form mark may be sensed by a top of form sensor. The top of form sensor may be an optical sensor such as that disclosed in U.S. Pat. No. 7,784,680; the disclosure of which is incorporated by reference in its entirety. The form may have preprinted information on the back side and/or on the front side of the paper. The information may include promotional material, advertising or other information, for example.

Sometimes, the service person may improperly load the paper. For example, the service person may put in the wrong paper such as paper that is not top of form paper. Alternatively the service person may install the paper in a wrong position, such as in an upside down orientation. If the paper is improperly loaded, the paper may jam and not properly move within the printer, and, in addition, the top of form sensor may not sense a top of form mark. The service person also may not notice that the paper is improperly loaded before they leave the machine. This situation results in additional downtime and cost to dispatch someone to fix the printer. An exemplary arrangement may prevent this situation from occurring.

Figure 22:
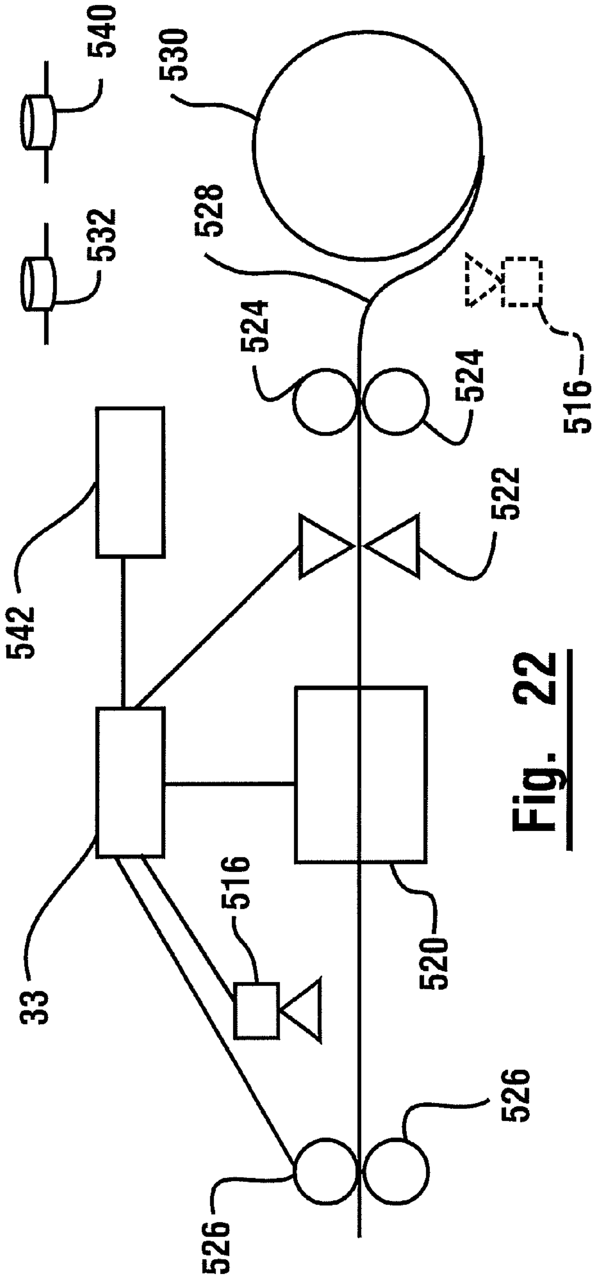
FIG. 22 is a side schematic view of a portion of an automated banking machine according to another exemplary embodiment.
Figure 23:
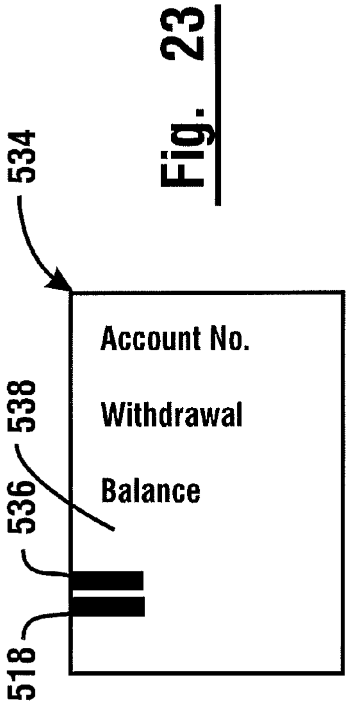
FIG. 23 is a top schematic view of portion of FIG. 22 showing an initial form from the printing paper loaded the automated banking machine.

Referring to FIG. 22, a sensor 516 is positioned downstream from a print head 520 of the printer 30. The sensor 516 may be an optical sensor or other suitable type sensor that can detect test marks printed on printing paper 528. The sensor 516 may also be a top of form sensor that can also detect the top of form marks 518 (FIG. 23). A paper cutter 522 is positioned upstream from the print head 520. Rollers 524, 526 are provided to engage and move the paper 528 from the paper roll 530. The rollers, top of form sensor, print head, and paper cutter may be operatively connected to the controller 33 or other controllers or processors in the machine. The machine 10 may include a manual form feed pushbutton 532 that when depressed will cause rollers 524 to feed paper 528 through the printer 30 until the top of form mark 518 moves within the sensing range of top of form sensor 516. This indicates that one form has been fed through the printer 30.

In this exemplary embodiment, the print head 520 is operative to print a test pattern and a test mark 536 on the initial form 534 of the paper as depicted in FIG. 23. The test mark 536 is configured to be able to be sensed by the sensor 516 when located within its sensing range. The machine 10 may also include a jog pushbutton 540 which causes the rollers 524, 526 to move the paper 528 continuously when depressed. An indicator 542 may be provided and is operatively connected to the controller 33. The indicator 542 may be operative to indicate a paper loading error or other printing malfunction to the serviceperson. The indicator 542 may be a visual indicator that includes light emitting diodes or a display. The indicator 542 may be an audio indicator that sounds an alarm. The indicator 542 may take the form of a mechanical type indicator such as the previously mentioned exemplary arrangement of the stop moveably mounted to the chest door or module door to prevent the door to close.

In operation, the paper roll 530 is loaded into the machine 10 and the leading end of the paper is positioned in engagement with the rollers 524. The manual form feed pushbutton 532 is then depressed, which causes the rollers 524, 526 to feed the paper 528 through the printer 30. As the paper 528 is fed through the printer 30, the print head prints a test pattern on the initial form and also prints the test mark 536. The paper 528 is moved by the rollers 524, 526 a predetermined distance that is sufficient for the test mark 536 to be within the sensing range of the sensor 516. Thus, when the initial form 534 is printed with the test pattern and the test mark 536, the sensor 516 is able to sense the test mark 536 and input this data to the controller 33. In response to this data, the controller 33 operates in accordance with its programming to determine that the correct paper is loaded in the correct orientation of the printer 30, the paper is moving properly, the printer is printing properly, and the machine 10 is ready to be placed back in service. The sensor 516 may also send a signal to the controller 33, which in turn causes the rollers 524, 526 to move the paper 528 such that the trailing end of the initial form 534 is at the cutter 522. The controller 33 then causes the cutter 522 to cut the paper 528 and then causes the rollers 524, 526 to transport the initial form 534 to a paper bin.

If the sensor 516 does not sense the test mark 536, the controller 33, responsive to the sensor 516, causes the indicator 542 to indicate a paper loading error in order to notify the service person loading the paper. If the indicator 542 is a visual indicator, the indicator may cause a red light emitting diode to illuminate. If the visual indicator is a display, a message may be displayed that indicates a paper loading error such as “paper loading error”. Alternatively or additionally, messages may be displayed that indicate the particular type of printer loading error based on what is sensed by the top of form sensor 516. For example, the controller 33 may determine that the paper loading error is caused by the service person loading the wrong type of paper and cause the display to display a message that reads “wrong paper”. In another example, the controller 33 may determine that the paper loading error is caused by the service person loading the paper in the incorrect orientation and cause the display to display a message that read “wrong paper orientation”.

If the indicator 542 is an audio indicator, an audio alarm may sound or audibly output a verbal message to notify the service person loading the paper. The verbal message may also indicate the particular type of printing loading error determined by the controller 33. For example, the controller 33 may determine that the paper loading error is caused by the service person loading the wrong type of paper and hence, may cause a verbal message to be audibly outputted that says “wrong paper”. In another example, the controller 33 may determine that the paper loading error is caused by the serviceperson loading the paper in the incorrect orientation and hence, may cause a verbal message to be audibly outputted that says “wrong paper orientation”. If the indicator 542 is a mechanical type indicator such as the previously mentioned exemplary arrangement of the stop 500 moveably mounted to the chest door 50 or module door 478, then when the chest door 50 or module door 478 is open and the controller 33, responsive to the top of form sensor 516, determines that there is a printer loading error, the solenoid 506, responsive to the controller 33, moves the stop 500 to the extended position, so that the door 50 cannot be move to the closed position.

If top of form paper is used, the print head 520 is also operative to print a test pattern and a test mark 536 on the initial form 534 of the top of form paper as depicted in FIG. 23. In this arrangement, the top of form mark 518 and the test mark 536 are on the same side 538 of the paper 528 and also in a predetermined relationship with respect to each other. For example, the test mark 536 may be located directly downstream from the top of form mark 518 and in close proximity to it as shown in FIG. 23. The sensor 516 is a top of form sensor that is configured to be able to sense the test mark 536 and the top of form mark 518 when each mark is located within the sensor's sensing range.

In operation, the paper roll 530 is loaded into the machine 10 and the leading end of the paper is positioned in engagement with the rollers 524. The manual form feed pushbutton 532 is then depressed, which causes the rollers 524, 526 to feed the paper 528 through the printer 30. As the paper 528 is fed through the printer 30, the print head prints a test pattern on the initial form and also prints the test mark. The paper 528 is moved by the rollers 524, 526 a predetermined distance that is sufficient for the top of form mark 518 and the test mark 536 to be within the sensing range of the top of form sensor 516. Thus, when the initial form 534 is printed with the test pattern and the test mark 536, the top of form sensor 516 is able to sense both marks in the predetermined relationship and input this data to the controller 33. In response to this data, the controller 33 operates in accordance with its programming to determine that the correct paper is loaded in the correct orientation of the printer 30, the paper is moving properly, the printer is printing properly, and the machine 10 is ready to be placed back in service. The top of form sensor 516 also sends a signal to the controller 33, which in turn causes the rollers 524, 526 to move the paper 528 such that the trailing end of the initial form 534 is at the cutter 522. The controller 33 then causes the cutter 522 to cut the paper 528 and then causes the rollers 524, 526 to transport the initial form 534 to a retracted receipt bin.

If the top of form sensor 516 does not sense both the top of form mark 518 and the test mark 536, or does not sense that the top of form mark 518 and the test mark 536 are in the predetermined required relationship, the controller 33, responsive to the top of form sensor 516, causes the indicator 542 to indicate a paper loading error in order to notify the service person loading the paper. If the indicator 542 is a visual indicator, the indicator may cause a red light emitting diode to illuminate. If the visual indicator is a display, a message may be displayed that indicates a paper loading error such as "paper loading error". Alternatively or additionally, messages may be displayed that indicate the particular type of printer loading error based on what is sensed by the top of form sensor 516. For example, the controller 33 may determine that the paper loading error is caused by the service person loading the wrong type of paper and cause the display to display a message that reads "wrong paper". In another example, the controller 33 may determine that the paper loading error is caused by the service person loading the paper in the incorrect orientation and cause the display to display a message that read "wrong paper orientation".

If the indicator 542 is an audio indicator, an audio alarm may sound or audibly output a verbal message to notify the service person loading the paper. The verbal message may also indicate the particular type of printing loading error determined by the controller 33. For example, the controller 33 may determine that the paper loading error is caused by the serviceperson loading the wrong type of paper and hence, may cause a verbal message to be audibly output that says "wrong paper". In another example, the controller 33 may determine that the paper loading error is caused by the service person loading the paper in the incorrect orientation and hence, may cause a verbal message to be audibly output that says "wrong paper orientation". If the indicator 542 is a mechanical type indicator such as the previously mentioned exemplary arrangement of the stop 500 moveably mounted to the chest door 50 or module door 478, then when the chest door 50 or module door 478 is open and the controller 33, responsive to the top of form sensor 516, determines that there is a printer loading error, the solenoid 506, responsive to the controller 33, moves the stop 500 to the extended position, so that the door cannot be move to the closed position.

In an alternative arrangement, two sensors may be used instead of one top of form sensor. The top of form sensor 516, as indicated by the phantom lines of FIG. 23, may be located upstream from the paper cutter 522 and rollers 524. This top of form sensor 516 is configured to only sense the top of form mark. The second sensor is located downstream stream of the printing head such as the location where the top of form sensor of the previous arrangement is located. This second sensor may be another top of form sensor or any other suitable sensor that is able to sense the test mark. Both sensors are operatively connected to the controller 33.

In operation of this alternative arrangement, the paper roll 530 is loaded into the machine 10 and the leading end of the paper 528 is positioned in engagement with the rollers 524. The manual form feed pushbutton 532 is then depressed, which causes the rollers to feed the paper through the printer 30. As the paper 528 is fed through the printer 30, the print head 520 prints a test pattern on the initial form 534 and also the test mark 536. The paper 528 is moved by the rollers a predetermined distance that is sufficient for the top of form mark 518 to be within the sensing range of the top of form sensor 516 and the test mark 536 to be within the sensing range of second sensor. Thus, when the initial form 534 is printed with the test pattern and the test mark 536, the second sensor is able to sense the test mark 536 and the top of form sensor 516 is able to sense the top of form mark 518. This data is inputted into the controller 33. The controller 33 also determines based on this data that the marks are in the predetermined required relationship with each other. In response to this data, the controller 33 operates in accordance with its programming to determine that the correct paper is loaded in the correct orientation of the printer 30, the paper 528 is moving properly, the printer 30 is printing properly, and the machine 10 is ready to be placed back in service. If either sensor does not sense its corresponding mark, or that the top of form mark 518 and the test mark 536 are not in the predetermined relationship, the controller 33, responsive to the sensors, causes the indicator 542 to indicate a paper loading error to notify the service person loading the paper 528.

When certain types of service are being performed on a machine, the machine goes out of service and cannot be used to conduct transactions. After a service activity is complete, the serviceperson provides inputs to instruct the machine to go into service. When this occurs, the exemplary machine runs a complete set of diagnostic tests on a plurality of modules and other serviceable components in the machine to ensure that the machine is working properly. Then machine controller, i.e. processor or computer, sends at least one message to each serviceable component to find out if it is ready to go in service. Each serviceable component then conducts at least one test and sends at least one response message to the machine controller indicative of whether it is in condition to go into service. This may take some time to accomplish.

Often, the service on the serviceable component may be simple. For example, the service for a cash dispenser may only require clearing a jam or adding or removing currency or other financial documents. Much of the time in this situation there is not a fault and thus, it may not be necessary to run a complete set of diagnostic tests on the serviceable component. An exemplary embodiment may reduce the time that it takes for the machine to go back into service based on the type of service. In this exemplary embodiment, the machine only runs a complete set of diagnostic tests on a particular serviceable component if that particular module had a fault indicating a malfunction at the time the machine was taken out of service.

Figure 24:
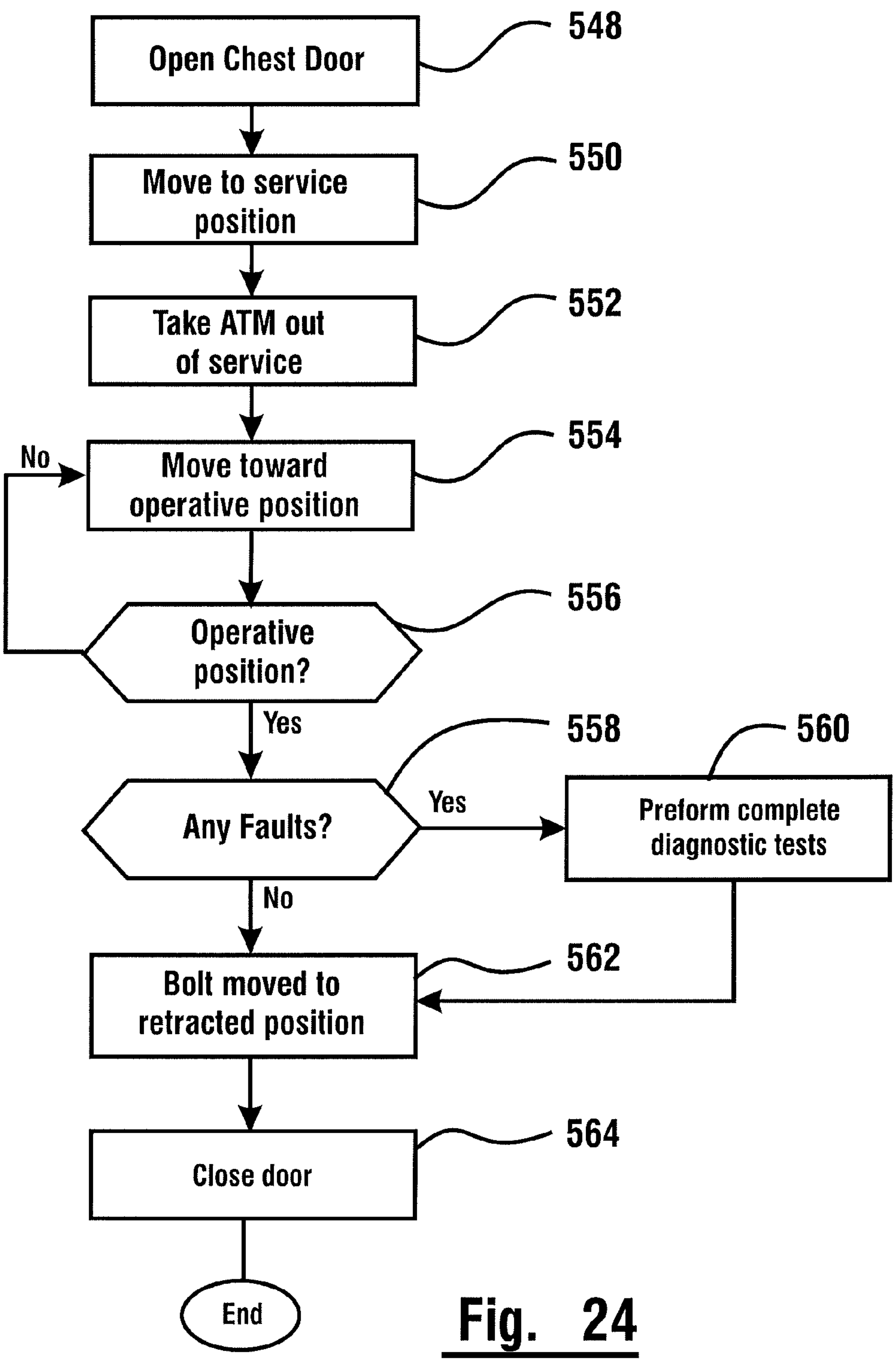
FIG. 24 is a schematic representation of steps for an exemplary process carried out by the automated banking machine of FIG. 19.

Referring to FIG. 21, the serviceable component such as the module 450 includes a data store 546 that is operative to store data corresponding to faults with respect to the serviceable component. The controller 33, which is operatively connected to the serviceable component, is operative to check the data store 546 to determine the type of fault and when it occurred. FIG. 24 illustrates the process of this exemplary embodiment. Included in this process is the process for preventing or allowing the chest door 50 to move in the closed position based on the position of the serviceable component. In this process, the serviceable component may be a currency dispenser 64 that dispenses currency or other financial documents. However, it should be noted that this process may be used for other type of serviceable components. Such serviceable components may include for example cash dispensers, cash acceptors, cash recyclers, check acceptors, printers, card readers, keypads or other types of devices that may be found in automated banking machines. In step 548, the door 50 to the chest 40 containing the dispenser 64 is opened by a service person to gain access to the dispenser 68. In step 550, the dispenser 64 is then moved from its operative position to a service position. As previously mentioned, when the dispenser 64 is not in the operative position, the controller 33, responsive to the at least one position sensor 460, causes the solenoid 506 to move the stop 500 to the extended position. In step 552, the machine 10 is taken out of service. Service is then performed on the dispenser 64 such as fixing a jam, etc.

In step 554, the dispenser 64 is moved back toward its operative position. In step 556, the controller 33, responsive to the at least one position sensor 460, determines whether the dispenser is in the operative position. If not, the process goes back to step 554. Indicators such as those previously mentioned may be provided to notify the service person that the dispenser is not in the operative position and also provide directions the service person to move the dispenser to the operative position. If the dispenser is in the operative position, then in step 558 the controller 33 checks the data store 546 for any faults that occurred before the machine 10 was taken out of service. If the controller 33 determines that at least one fault occurred before the dispenser was taken out of service, then the controller 33 causes the machine 10 to perform a complete set of diagnostic tests on the dispenser as represented by step 560. After the complete set of diagnostic test are performed on the dispenser and no error or faults are determined, the controller 33 then causes the solenoid 506 to move the stop 500 to its retracted position to allow the chest door 50 to close as represented by step 562. If the controller 33 does not determine that at least one fault occurred before the machine 10 was taken out of service, then the process goes to step 562 without the dispenser having to undergo a complete set of diagnostic tests. Then, the chest door 50 is closed and machine 10 is then put back into service as represented by step 564. The process is then complete. Alternatively, after the controller 33 determines that the dispenser is in the operative position in step 556, the stop may be moved to its retracted position before the controller checks the data store 546 for faults occurring before the machine 10 was taken out of service. Also, alternatively, the controller 33 may determine, responsive to the position sensor 460, whether the dispenser 64 is in the operative position either after determining that no fault occurred before the machine was taken out of service, or if such fault occurred, after the complete set of diagnostic tests is performed on the dispenser 64.

Alternatively or in addition, the machine 10 may be configured to allow a service person to select whether to have the machine 10 perform a complete set of diagnostics tests on the dispenser regardless of whether a fault occurred before the machine 10 was taken out of service. For example, the machine 10 may provide the option to run a complete set of diagnostic test on the dispenser or check only for faults occurring before the machine 10 was taken out of service. The service person may be allowed to select the option by pushing a function key button next to the options on the display or through other inputs. The machine may display these options and prompt the user to enter an option after the dispenser 64 is moved toward the operative position. Alternatively, instead of using function keys, the display may be a touch screen in which the user may select the option by touching a button displayed next to the option. Other input devices can be used as well such as a keypad or even devices not part of the machine such as a cell phone, iPod®, iPad® or personal digital assistance. The machine may also be programmed so that the default mode is not to perform a complete set of diagnostic tests on the serviceable component, but allow a service person to override this procedure. In this case, a service person may provide one or more inputs to an interface of the machine that causes the machine to perform a complete set of diagnostics regardless of whether a fault occurred before the machine is taken out of service.

Alternatively or in addition, instead of having the serviceable component not undergo the complete set of diagnostic tests, the machine may perform, or the user may select, that the machine perform some or a limited number of diagnostic tests on the serviceable component, if the controller does not determine that at least one fault occurred before the machine was taken out of service.

Thus the automated banking machines and systems of the exemplary embodiments may achieve one or more of the above stated objectives, eliminate difficulties encountered in the use of prior devices and systems, solve problems and attain the desirable results described herein.

In the foregoing description certain terms have been used for brevity, clarity and understanding, however no unnecessary limitations are to be implied therefrom because such terms are for descriptive purposes and are intended to be broadly construed. Moreover, the descriptions and illustrations herein are by way of examples and the invention is not limited to the details shown and described.

In the following claims any feature described as a means for performing a function shall be construed as encompassing any means capable of performing the recited function, and shall not be deemed limited to the particular means shown in the foregoing description or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods, processes and relationships are set forth in the appended claims.

We claim:

1. Apparatus comprising:

an automated banking machine that is operative to cause financial transfers responsive at least in part to data read from data bearing records, wherein the automated banking machine includes:

a housing, wherein the housing bounds an interior area, wherein the housing includes an opening to the interior area, a card reader, wherein the card reader is operative to read data from cards usable to identify at least one of a user of the machine and a financial account, at least one computer associated with the machine, wherein the at least one computer is in operative connection, with the card reader, wherein the at least one computer is operative to cause card data to be read through operation of the card reader, a determination to be made that the card data corresponds to a financial account on which a transaction is authorized to be conducted through operation of the machine, and responsive at least in part to the determination, the financial account to be at least one of credited and assessed a value associated with the financial transaction, a door, wherein the door is moveably mounted in operative connection with the housing, wherein the door is moveable between a closed position in which the door at least partially covers the opening, and an open position, a serviceable component, wherein the serviceable component is moveably mounted in operatively supported connection with the housing, wherein the serviceable component is moveable between an operative position and at least one other position, at least one position sensor, wherein the at least one position sensor is operative to sense the serviceable component in at least one of the operative position and at least one other position, a stop, wherein the stop is moveably mounted in operatively supported connection with the housing, wherein the stop is operatively engageable with the door, wherein the stop is in operative connection with the at least one position sensor, wherein the stop is operative to prevent the door from closing responsive to the at least one position sensor determining that the serviceable component is not in the operative position.

2. The apparatus according to claim 1, wherein the housing includes a chest, wherein the chest bounds the interior area.

3. The apparatus according to claim 2, wherein the component includes a module, wherein at least one other position includes a service position, and wherein in the service position, at least a portion of the module extends in the opening of the housing.

4. The apparatus according to claim 1, wherein the serviceable component includes a cassette, wherein the cassette is configured to hold financial documents.

5. The apparatus according to claim 1, wherein the stop is operative responsive at least in part to the serviceable component being in the operative position to cause the door to be allowed to be moved to the closed position.

6. The apparatus according to claim 5, wherein the stop is moveable between a blocking position and a nonblocking position, wherein in the blocking position the stop is operatively engageable with the door to cause the door to be presented from being moved to the closed position, and wherein the nonblocking position of the stop the door is moveable to the closed position.

7. The apparatus according to claim 6, wherein the at least one computer is in operative connection with the serviceable component and the stop, wherein the at least one computer is operative to determine whether the serviceable component has a fault stored in a data store associated with the component, wherein the at least one computer is operative to cause the stop to prevent the door from being moved to the closed position response at least in part to a determination that a fault was stored in the data store before the serviceable component was moved to the operative position from the service position.

8. The apparatus according to claim 7 wherein the serviceable component is capable of undergoing a set including a plurality of diagnostic tests, wherein the at least one computer is operative to cause the serviceable component to not undergo all the plurality of diagnostic tests in the set responsive at least in part to the determination that the fault is stored in the data store of the serviceable component before the serviceable component is moved to the operative position form the service position.

9. The apparatus according to claim 7, wherein the at least one computer is operative not to cause the stop to prevent the door from being moved to the closed position responsive at least in part to a determination that no fault is stored in the data store of the serviceable component.

10. The apparatus according to claim 9, wherein the serviceable component includes at least one of a cash acceptor, a cash dispenser, a check acceptor, a cash recycler, a printer, and a depository.

11. The apparatus according to claim 10 and further comprising at least one door sensor, wherein the at least one door sensor is operative to sense the door in at least one position, wherein the at least one door sensor is in operative connection with the at least one computer, wherein the at least one computer is operative to cause at least one message to be sent to a remote computer disposed away from the machine responsive at least in part to the serviceable component being sensed through operation of the at least one sensor as not in the operative position, and the door being sensed through operation of the at least one door sensor as being in the closed position.

12. The apparatus according to claim 11 and further comprising a lock, wherein the lock is in operative connection with the door, wherein in the closed position of the door the lock is changeable between locked and unlocked conditions, wherein the lock in a locked condition is operative to hold the door in a closed position.

13. The apparatus according to claim 6 and further comprising an actuator in operative connection with the stop, wherein the actuator is operative responsive at least in part to the at least one position sensor to move the stop between the blocking and nonblocking positions.

14. The apparatus according to claim 13, wherein the at least one position sensor includes at least one of a reed switch, a vane sensor, a Hall effect sensor, a magneto resistive sensor, a variable reluctance sensor, an inductive sensor, an infrared sensor, a photo sensor, and an opto-electronic sensor.

15. The apparatus according to claim 1, wherein the at least one computer is in operative connection with the serviceable component and the stop, wherein the at least one computer is operative to determine whether the serviceable component has a fault stored in a data store associated with the serviceable component, wherein the at least one computer is operative to cause the stop to prevent the door from being moved to the closed position responsive at least in part to a determination that the fault is stored in the data store before the serviceable component is moved to the operative position from the service position.

16. Apparatus comprising:

an automated banking machine that is operative to cause financial transfers responsive at least in part to data read from data bearing records, wherein the automated banking machine includes:

a housing, wherein the housing bounds an interior area, wherein the housing includes an opening to the interior area, a card reader, wherein the card reader is operative to read data from cards usable to identify at least one of a user of the machine and a financial account, at least one computer associated with the machine, wherein the at least one computer is in operative connection with the card reader, wherein the at least one computer is operative to cause card data to be read through operation of the card reader, a determination to be made that the card data corresponds to a financial account on which a transaction is authorized to be conducted through operation of the machine, and responsive at least in part to the determination, the financial account to be at least one of credited and assed a value associated with the financial transaction, a door, wherein the door is moveably mounted in operatively supported connection with the housing, wherein the door is operative to control access through the opening to the interior area, a lock, wherein the lock is in operative connection with the door, wherein the lock is changeable between locked and unlocked conditions, wherein in the locked condition the door is held in a locked door condition wherein the door blocks access through the opening, a serviceable component, wherein the serviceable component includes one of a group consisting of a check acceptor, a bill acceptor, a cash dispenser, and a cash recycler, wherein the serviceable component is moveable relative to the housing and in operatively supported connection therewith, wherein the serviceable component is moveable between an operative position and at least one other position, at least one sensor, wherein the at least one sensor is operative to sense the serviceable component in at least one position, at least one moveable member, wherein the at least one sensor is in operative connection with the at least one moveable member, wherein the at least one moveable member is operative to prevent the door from being in the locked door condition responsive to the at least one sensor determining that the serviceable component is not in the operative position.

17. The apparatus according to claim 16 wherein the at least one moveable member includes a stop, wherein the stop is moveably mounted in operatively supported connection with the housing, wherein the door is moveable between an open position and a closed position, wherein in the locked door condition the door is in the closed position, and wherein responsive at least in part to the serviceable component being sensed in other than the operative position, the stop is operative to prevent the door from being moved to the closed position.

18. The apparatus according to claim 16, further comprising a bolt, wherein the bolt is moveably mounted in operatively supported connection with at least one of the door and the housing, wherein the bolt is moveable between secured and unsecured positrons, and wherein the bolt is held in a secured position in the locked door condition of the door, wherein responsive at least in part to the serviceable component being sensed in other than the operative position, the stop is operative to prevent the bolt from being held in the secured position.

19. The apparatus according to claim 16, wherein the at least one moveable member is in operative connection with the lock, wherein responsive at least in part to the serviceable component being sensed in other than the operative position, the at least one moveable member is operative to prevent the lock from being changed from the unlocked condition to the locked condition.

20. The apparatus according to claim 16, wherein the at least once computer is in operative connection with the serviceable component and the at least one moveable member, wherein the serviceable component includes a data store, wherein the at least one computer is in operative connection with the data store, and wherein the data store is operative to store data corresponding to at least one fault condition of the serviceable component, wherein the at least one computer is operative to prevent at least one of the door and the lock from changing to the locked door condition responsive at least, in part to a determination by the at least one computer that the data store includes data corresponding to a fault condition.

* * * * *